United States Patent
West et al.

(10) Patent No.: US 10,295,239 B2
(45) Date of Patent: May 21, 2019

(54) CONTROLS AND OPERATION OF VARIABLE FREQUENCY DRIVES

(71) Applicant: TRANE INTERNATIONAL INC., Piscataway, NJ (US)

(72) Inventors: Nathan Thomas West, Holmen, WI (US); Benjamin James Sykora, Holmen, WI (US); David Marshall Foye, LaCrosse, WI (US); Dennis Myron Beekman, LaCrosse, WI (US); Korwin Jay Anderson, Pasadena, CA (US); Robert Bakkestuen, Onalaska, WI (US)

(73) Assignee: Trane International Inc., Piscataway, NJ (US)

( * ) Notice: Subject to any disclaimer, the term of this patent is extended or adjusted under 35 U.S.C. 154(b) by 649 days.

(21) Appl. No.: 14/849,762

(22) Filed: Sep. 10, 2015

(65) Prior Publication Data

US 2015/0377536 A1   Dec. 31, 2015

Related U.S. Application Data

(63) Continuation of application No. PCT/US2014/023028, filed on Mar. 11, 2014.
(Continued)

(51) Int. Cl.
*F25B 49/02* (2006.01)
*F04C 28/28* (2006.01)
(Continued)

(52) U.S. Cl.
CPC ........ *F25B 49/022* (2013.01); *F04C 18/0215* (2013.01); *F04C 18/16* (2013.01);
(Continued)

(58) Field of Classification Search
CPC .................................. F25B 49/00; F25B 49/02
See application file for complete search history.

(56) References Cited

U.S. PATENT DOCUMENTS

| 5,006,045 A | 4/1991 | Shimoda et al. |
| 5,561,354 A | 10/1996 | Simons et al. |

(Continued)

FOREIGN PATENT DOCUMENTS

| EP | 0559480 | 3/1993 |
| JP | 07218059 | 8/1995 |

(Continued)

OTHER PUBLICATIONS

Variable-Frequency Drive, Wikipedia, also available at https://en.wikipedia.org/wiki/Variable-frequency_drive, Dec. 13, 2012, 15 pgs.

(Continued)

*Primary Examiner* — Ljiljana V. Ciric
*Assistant Examiner* — Alexis K Cox
(74) *Attorney, Agent, or Firm* — Taft Stettinus & Hollister LLP

(57) ABSTRACT

A system includes a refrigerant circuit including a compressor, a condenser, an expander, an electric motor configured to drive the compressor, and a controller configured to control a motor drive to drive the electric motor. The controller is configured to first evaluate whether the compressor is idle based upon a control state of the controller being configured not to operate the motor drive to drive the motor, second, in response to an affirmative evaluation that the compressor is idle, evaluate a risk of undesired or un-commanded compressor rotation based upon a combination of two or more system conditions, each of the two or more system conditions indicating the risk of undesired or un-commanded compressor rotation, and third, in response (Continued)

to an affirmative evaluation of the risk of undesired or un-commanded compressor rotation, control the motor drive to oppose rotation of the compressor.

18 Claims, 12 Drawing Sheets

Related U.S. Application Data

(60) Provisional application No. 61/776,911, filed on Mar. 12, 2013, provisional application No. 61/776,973, filed on Mar. 12, 2013, provisional application No. 61/776,027, filed on Mar. 11, 2013.

(51) Int. Cl.

| | | |
|---|---|---|
| *F04C 18/16* | (2006.01) | |
| *F25B 31/02* | (2006.01) | |
| *F04C 18/02* | (2006.01) | |
| *F04C 28/04* | (2006.01) | |
| *F04C 28/08* | (2006.01) | |
| *F04C 29/00* | (2006.01) | |
| *G05D 23/00* | (2006.01) | |
| *F25B 1/00* | (2006.01) | |

(52) U.S. Cl.
CPC ............. *F04C 28/04* (2013.01); *F04C 28/08* (2013.01); *F04C 28/28* (2013.01); *F04C 29/0085* (2013.01); *F25B 31/02* (2013.01); *F04C 18/02* (2013.01); *F04C 2240/40* (2013.01); *F04C 2240/403* (2013.01); *F04C 2240/808* (2013.01); *F04C 2270/02* (2013.01); *F04C 2270/80* (2013.01); *F04C 2270/86* (2013.01); *F25B 1/00* (2013.01); *F25B 49/025* (2013.01); *F25B 2339/047* (2013.01); *F25B 2500/28* (2013.01); *F25B 2600/021* (2013.01); *F25B 2600/0253* (2013.01); *F25B 2700/151* (2013.01); *F25B 2700/171* (2013.01); *G05D 23/00* (2013.01); *Y02B 30/741* (2013.01)

(56) References Cited

U.S. PATENT DOCUMENTS

| | | |
|---|---|---|
| 5,705,989 A | 1/1998 | Cota et al. |
| 5,721,478 A | 2/1998 | Vezinet et al. |
| 5,782,610 A | 7/1998 | Ikeda |
| 6,014,325 A | 1/2000 | Pecore |
| 6,121,749 A | 9/2000 | Wills et al. |
| 6,210,119 B1 | 4/2001 | Lifson et al. |
| 6,254,352 B1 | 7/2001 | Niizato et al. |
| 6,544,009 B2 | 4/2003 | Makino et al. |
| 6,564,576 B2 | 5/2003 | Shibuya |
| 6,599,104 B2 | 7/2003 | Saito et al. |
| 6,646,411 B2 | 11/2003 | Hirono et al. |
| 7,083,399 B2 | 8/2006 | Kurihara et al. |
| 7,387,602 B1 | 6/2008 | Kirsch |
| 7,508,160 B1 | 3/2009 | Rudniski |
| 7,554,278 B2 | 6/2009 | Wegner-Donnelly et al. |
| 7,573,144 B1 | 8/2009 | Saban et al. |
| 7,679,313 B2 | 3/2010 | Aiello et al. |
| 7,723,864 B2 | 5/2010 | Zub et al. |
| 7,830,111 B2 | 11/2010 | Aiello et al. |
| 7,977,910 B2 | 7/2011 | Osman et al. |
| 8,134,316 B2 | 3/2012 | Osman et al. |
| 8,203,236 B2 | 6/2012 | Gallegos-Lopez et al. |
| 8,324,846 B2 | 12/2012 | Marchand et al. |
| 2002/0157405 A1* | 10/2002 | Haley .................. F25B 49/022 62/127 |
| 2005/0247073 A1 | 11/2005 | Hikawa et al. |
| 2006/0201726 A1 | 9/2006 | Won et al. |
| 2007/0063661 A1 | 3/2007 | Galli et al. |
| 2008/0115512 A1 | 5/2008 | Rizzo |
| 2009/0292395 A1* | 11/2009 | DiFatta .................. F04C 18/02 700/275 |
| 2009/0324427 A1 | 12/2009 | Tolbert, Jr. et al. |
| 2010/0020470 A1 | 1/2010 | Edmunds et al. |
| 2010/0178175 A1 | 7/2010 | Koyama |
| 2011/0000721 A1 | 1/2011 | Hassett et al. |
| 2011/0208325 A1 | 8/2011 | Liu |
| 2011/0247323 A1 | 10/2011 | Kenway et al. |
| 2012/0017634 A1 | 1/2012 | Dorman et al. |
| 2013/0045113 A1 | 2/2013 | Foye |
| 2013/0129527 A1 | 5/2013 | Hamdan |

FOREIGN PATENT DOCUMENTS

| | | |
|---|---|---|
| JP | 1146494 | 2/1999 |
| JP | 2000287485 | 10/2000 |
| WO | 2012012423 | 1/2012 |

OTHER PUBLICATIONS

Danfoss, VFD 101 Lesson 4, Application Terminology for a VFD, as early as Dec. 2012, 21 pgs.

Dallas Personal Robotics Group, Brief H-bridge Theory of Operation, Dec. 10, 2012, 4 pgs.

The H-Bridge, also available at http://talkingelectronics.com/projects/H-Bridge/H-Bridge-1.html, Dec. 10, 2012, 16 pgs.

International Search Report and Written Opinion, International Patent Application No. PCT/US2014/023028, dated Jul. 10, 2014, 13 pgs.

\* cited by examiner

CONTROLS AND OPERATION OF VARIABLE FREQUENCY DRIVES

BACKGROUND

The present application relates generally to controls and operation of variable frequency drives and more particularly, but not exclusively to controls and operation of variable frequency drives in connection with heating, cooling, air-conditioning and/or refrigeration ("HVACR") systems. In such systems, undesired, un-commanded or uncontrolled compressor rotation, for example, reverse rotation of a screw or scroll compressor, poses substantial issues. Mitigating the potential for such occurrences remains an area of interest as present approaches to this suffer from a variety of limitations and disadvantages. Undesired, uncontrolled or un-commanded compressor operation may result in damage to system components either in the form of abrupt failure or increased wear and tear. These issues may be of particular interest in HVACR applications including compressors driven by electric motors which are in turn driven by variable frequency drives. There is a significant need for the unique and inventive apparatuses, methods and systems disclosed herein.

SUMMARY

One embodiment is a system comprising a refrigerant circuit including a compressor configured to compress refrigerant, a condenser configured to receive refrigerant from the compressor, and an expander configured to receive refrigerant from the condenser; an electric motor configured to drive the compressor; a power supply configured to drive the electric motor; and a controller configured to control the power supply to drive the electric motor and analyze at least one system condition; wherein the controller is configured to identify a condition associated with risk of undesired or un-commanded compressor rotation based upon the at least one system condition and control the power supply to oppose rotation of the compressor based upon the identification of the condition. In some forms the controller being configured to control the power supply to oppose rotation of the compressor comprises the controller being configured to control the power supply to provide a short circuit condition effective to provide an electrical resistance to current generated by rotation of the motor. In some forms the short circuit condition comprises two or more switching devices of the power supply being closed to provide a short circuit. In some forms the short circuit condition comprises providing a closed circuit including two or more windings of the motor and a rail of the power supply.

In some forms the controller being configured to control the power supply to oppose rotation of the compressor comprises the controller being configured to control the power supply to provide a DC current to the motor effective to urge the motor to a predetermined alignment and resist rotation of the motor. In some forms the controller being configured to identify a condition associated with risk of undesired or un-commanded compressor rotation based upon the at least one system condition comprises identifying a pressure differential across the compressor associated with risk of undesired or un-commanded compressor rotation. In some forms the controller being configured to identify a condition associated with risk of undesired or un-commanded compressor rotation based upon the at least one system condition comprises identifying an idle condition of the compressor and a pressure condition associated with risk of undesired or un-commanded compressor rotation. In some forms the controller being configured to identify a condition associated with risk of undesired or un-commanded compressor rotation based upon the at least one system condition comprises first identifying whether the compressor is commanded not to operate and second identifying a pressure condition associated with risk of undesired or un-commanded compressor rotation.

In some forms the power supply comprises an inverter. In some forms the power supply comprises a variable frequency drive. In some forms the condition associated with risk of undesired or un-commanded compressor rotation comprises rotation of a rotor of the motor. In some forms the condition associated with risk of undesired or un-commanded compressor rotation comprises rotation of the compressor being detected with a sensor. In some forms the condition associated with risk of undesired or un-commanded compressor rotation comprises back EMF indicative of rotation being detected at a motor terminal.

One embodiment is a method comprising providing an HVACR system including an electrical drive configured to drive an electric motor, a compressor configured to be driven by the electric motor, and a controller configured to control output of the drive and analyze a condition of the system; identifying a system condition associated with risk of undesired or un-commanded compressor rotation; controlling the drive to electrically oppose rotation of the motor effective to oppose rotation of the compressor. In some forms the act of controlling the drive to electrically oppose rotation of the motor comprises controlling the drive to provide a current to the motor effective to force the motor toward a predetermined position. In some forms the magnitude of the current is selected to provide force sufficient to resist force attributable to the system condition associated with risk of undesired or un-commanded compressor rotation. In some forms the act of controlling the drive to electrically oppose rotation of the motor comprises controlling the drive to provide a closed circuit including two or more windings of the electric motor and including an electrical resistance effective to resist rotation of the motor based upon dissipation of current induced in the motor by rotation. In some forms the closed circuit further includes two or more switches of the drive and one or more rails of the drive.

In some forms the act of identifying a system condition associated with risk of undesired or un-commanded compressor rotation includes identifying a pressure condition at least one of upstream and downstream of the compressor. In some forms the act of identifying a system condition associated with risk of undesired or un-commanded compressor rotation includes identifying a pressure differential across the compressor. In some forms the act of identifying a system condition associated with risk of undesired or un-commanded compressor rotation includes identifying whether the compressor is in an idle state. In some forms the act of identifying a system condition associated with risk of undesired or un-commanded compressor rotation includes identifying whether the compressor is in an idle state and identifying a pressure condition associated with the compressor. In some forms the act of identifying a system condition associated with risk of undesired or un-commanded compressor rotation includes first determining whether the drive, the motor or the compressor is in a non-operational state, and second determining a pressure condition associated with risk of undesired or un-commanded compressor rotation. In some forms the act of identifying a system condition associated with risk of undesired or un-commanded compressor rotation comprises detecting rotation of the motor with a sensor. In some forms the act of identifying a system condition associated with risk of undesired or un-commanded compressor rotation comprises detecting rotation of the compressor. In some forms the act of identifying a system condition associated with risk of undesired or un-commanded compressor rotation comprises detecting back EMF or a current induced by back EMF indicative of rotation at a motor terminal.

One embodiment is a method for starting a compressor in a refrigerant loop, comprising operating the compressor in a first mode which includes preventing current level for a motor of the compressor from exceeding a predetermined current limit for a period of time not to exceed a predetermined period of time and determining if the motor exceeds a predetermined speed threshold at or before expiration of the predetermined period of time. Some forms further comprise operating the compressor in a second mode in response to determining the motor has exceeded the predetermined speed threshold at or before expiration of the predetermined period of time. In some forms operation of the compressor in the second mode includes increased motor speed relative to operation of the compressor in the first mode. Some forms further comprise stopping operation of the compressor in response to determining the motor has failed to exceed a predetermined speed threshold at or before expiration of the predetermined period of time. In some forms the compressor is a screw compressor. In some forms operation of the compressor in the first mode is performed in response to determining motor torque exceeds a predetermined value. Some forms further comprise measuring motor current and using the measured motor current to determine motor torque. In some forms operation of the compressor in the first mode is automatically performed upon starting the compressor. In some forms the predetermined current limit and the predetermined period of time are selected to provide a liquid clearing function without damage to the compressor. In some forms preventing the current level for the motor of the compressor from exceeding the predetermined current limit includes limiting voltage supplied to the motor.

One embodiments is a system comprising a refrigerant compressor including an electric motor and a controller configured to operate the compressor in a start mode where current of the motor is prevented from exceeding a predetermined current limit for a period of time not to exceed a predetermined period of time, and to operate the compressor in a run mode in response to determining the motor exceeds a predetermined speed threshold at or before expiration of the predetermined period of time. In some forms the controller is further configured to stop operation of the compressor in response to determining the motor fails to reach the predetermined speed threshold at or before expiration of the predetermined period of time. In some forms operation of the compressor in the run mode includes increased motor speed relative to operation of the compressor in the start mode. In some forms the controller is further configured to operate the compressor in the start mode in response to a determination that motor torque exceeds a predetermined value. Some forms further comprise a sensor configured to measure motor current and provide a corresponding indication to the controller, wherein the controller is further configured to use the measured motor current to determine motor torque. In some forms the controller is further configured to automatically operate the compressor in the start mode upon activation of the compressor. In some forms the predetermined current limit corresponds to a maximum current rating for operation of the compressor with the speed of the motor at or under the speed of the predetermined speed threshold in order to avoid compressor damage. Some forms further comprise a refrigeration loop, a condenser, an evaporator and a variable frequency drive.

One embodiment is a method for operating a refrigerant compressor comprising following a speed trajectory configured to maintain motor speed of the compressor from exceeding a predetermined speed limit for a predetermined period of time following start of the compressor and stopping operation of the compressor if motor current of the compressor exceeds a predetermined current limit before expiration of the predetermined period of time. In some forms the predetermined speed limit and predetermined period of time are selected to provide a liquid clearing function without damage to the compressor. In some forms the speed trajectory is further configured to increase motor speed of the compressor above the predetermined speed limit following expiration of the predetermined period of time. In some forms the speed trajectory includes a first segment falling within the predetermined period of time, the first segment including a speed increase period to the speed of the predetermined speed limit following start of the compressor and a dwell period at the speed of the predetermined speed threshold until expiration of the predetermined period of time. In some forms the compressor is a screw compressor. In some forms the speed trajectory is automatically followed upon starting the compressor. In some forms the speed trajectory is followed in response to determining motor torque exceeds a predetermined value.

One embodiment is a system comprising a refrigerant compressor including an electric motor and a controller configured to operate the compressor in a start mode configured to prevent speed of the motor from exceeding a predetermined speed limit for a predetermined period of time following start of the compressor, and to stop operation of the compressor if current of the motor exceeds a predetermined current limit before expiration of the predetermined period of time. In some forms the predetermined speed limit and predetermined period of time are selected to provide a liquid clearing function without damage to the compressor. In some forms the controller is further configured to operate the compressor in a run mode following expiration of the predetermined period of time, the run mode including a higher motor speed relative to the start mode. In some forms the controller is further configured to automatically operate the compressor in the start mode following activation of the compressor. In some forms the predetermined current limit corresponds to a maximum current rating for operation of the compressor with the speed of the motor at or under the speed of the predetermined speed limit in order to avoid compressor damage One embodiment is method comprising supplying current from a drive to start an electric motor that is mechanically coupled with and configured to drive a compressor of an HVACR system, the compressor configured to operate in one direction; determining information indicative of a current drawn by said electric motor during a selected time period during the supplying; comparing said information to a threshold; and interrupting operation of the motor if said information exceeds the threshold. In some forms said act of interrupting comprises terminating said supply of current. In some forms said act of determining comprises receiving input from a sensor at a controller input. In some forms said act of determining comprises converting the input received from the sensor from analog to digital. In some forms the determining occurs during a predetermined time period after the commencement of the act of supplying current. In some forms the predetermined time period is selected to occur after an initial time period in which a current spike is expected. Some forms further comprise continuing said act of supplying current to said electric motor after said motor is started if said information does not exceed the threshold.

One embodiments is a system comprising an electric motor drivingly coupled to a screw or scroll compressor a power supply drivingly coupled to said electric motor; and a controller configured to control the power supply to selectably supply current to the electric motor, evaluate a characteristic of the current drawn from the power supply by the motor relative to a threshold, and control the power supply to cease supplying current to the electric motor based upon an evaluation that the characteristic is greater than the threshold. In some forms the controller includes a supply module structured to selectably supply continuous current from said power supply to said electric motor. In some forms the characteristic is a current magnitude. In some forms the controller includes a current module structured to interpret a magnitude of a current drawn by said electric motor during a selected time period and evaluate said magnitude relative to the threshold. In some forms the power supply comprises a variable frequency drive. In some forms the threshold is selected to distinguish a current condition attributable to the screw or scroll compressor being driven in a reverse direction and a current condition attributable to starting of the compressor in a forward direction. In some forms the threshold is selected to be greater in magnitude than a maximum characteristic value expected when starting the compressor with the electric motor coupled to the power supply. In some forms the characteristic value is a current magnitude.

One embodiment is an apparatus comprising a non-transitory computer readable medium configured with instructions executable by a computer to perform the following acts: command a drive to supply current to an electric motor in response to a start command; determine a characteristic of current flowing through the electric motor; compare the characteristic with one or more predetermined criteria; and command the drive to stop supplying current to the electric motor based upon the characteristic not meeting at least one of the one or more predetermined criteria. In some forms the one or more predetermined criteria comprise a current magnitude limit. In some forms the one or more predetermined criteria comprise a limit on integrated current or summed current. In some forms the one or more predetermined criteria comprise a limit on instantaneous rate of change of current or a limit on a current differential. In some forms the electric motor comprises one of an induction motor and a permanent magnet motor. In some forms the compressor comprises one of a scroll compressor and a screw compressor. It shall be understood that the techniques, methods, controls, diagnostics, and logic disclosed herein may be implemented in a variety of software, hardware, firmware, and combinations thereof. Further embodiments, forms, objects, features, advantages, aspects, and benefits shall become apparent from the following description and drawings.

DETAILED DESCRIPTION OF ILLUSTRATIVE EMBODIMENTS

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

Figure 1:
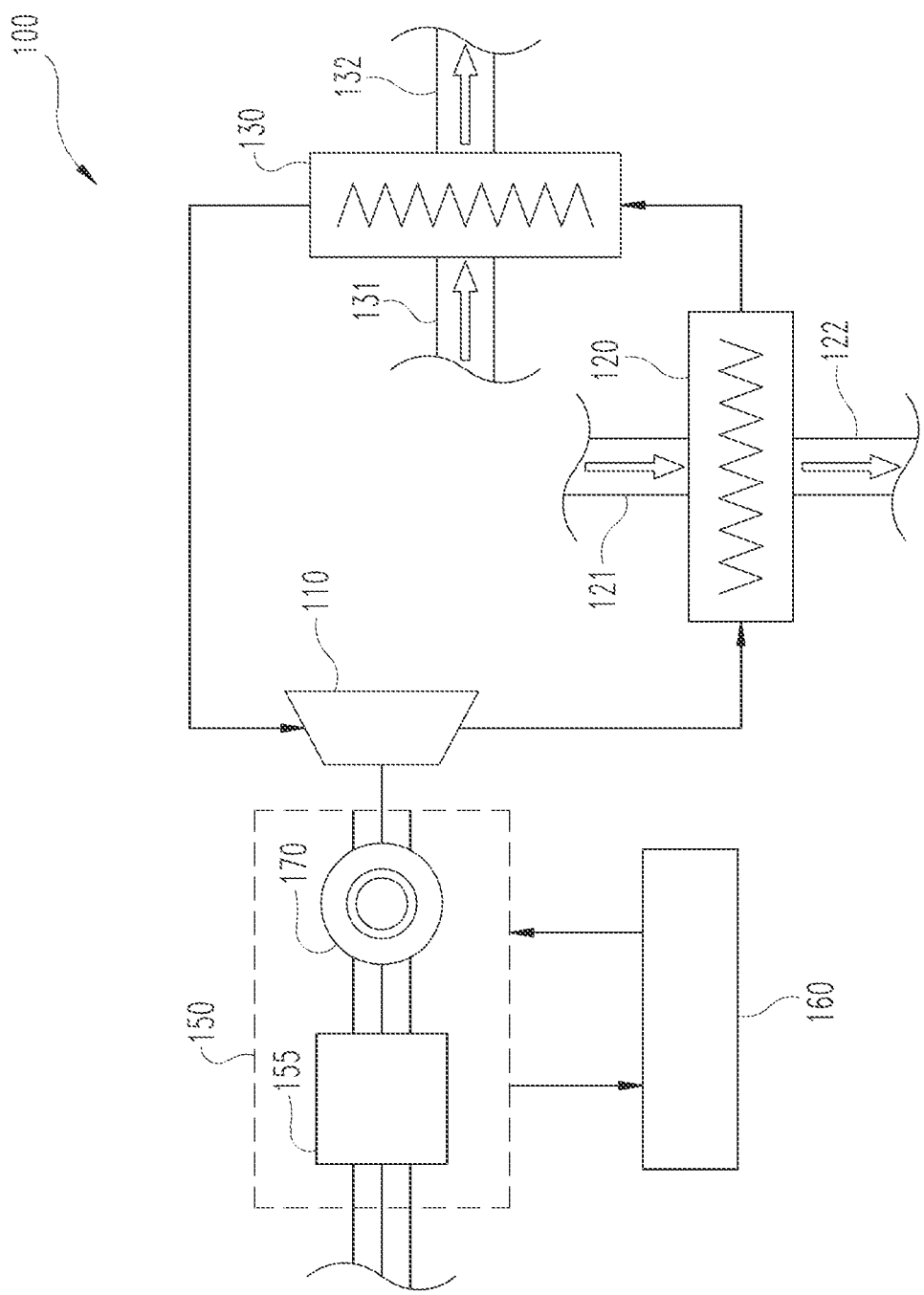
FIG. 1 is a schematic illustration of an exemplary HVACR system.

With reference to FIG. 1 there is illustrated an exemplary HVACR system 100 which includes a refrigerant loop comprising a compressor 110, a condenser 120, and an evaporator 130. Compressor 110 may be a screw compressor, a scroll compressor, or another type of compressor which is designed to rotate only in one direction. Refrigerant flows through system 100 in a closed loop from compressor 110 to condenser 120 to evaporator 130 and back to compressor 110. Various embodiments may also include additional refrigerant loop elements including, for example, valves for controlling refrigerant flow, refrigerant filters, economizers, oil separators and/or cooling components and flow paths for various system components.

Compressor 110 is driven by a drive unit 150 including a permanent magnet electric motor 170 which is driven by a variable frequency drive 155. In the illustrated embodiment, variable frequency drive 155 is configured to output a three-phase PWM drive signal, and motor 170 is a surface magnet permanent magnet motor. Use of other types and configurations of variable frequency drives and electric motors such as interior magnet permanent magnet motors, reluctance motors, or inductance motors are also contemplated. It shall be appreciated that the principles and techniques disclosed herein may be applied to a broad variety of drive and permanent magnet motor configurations.

Condenser 120 is configured to transfer heat from compressed refrigerant received from compressor 110. In the illustrated embodiment condenser 120 is a water cooled condenser which receives cooling water at an inlet 121, transfers heat from the refrigerant to the cooling water, and outputs cooling water at an output 122. It is also contemplated that other types of condensers may be utilized, for example, air cooled condensers or evaporative condensers. It shall further be appreciated that references herein to water include water solutions comprising additional constituents unless otherwise limited.

Evaporator 130 is configured to receive refrigerant from condenser 120, expand the received refrigerant to decrease its temperature and transfer heat from a cooled medium to the refrigerant. In the illustrated embodiment evaporator 130 is configured as a water chiller which receives water provided to an inlet 131, transfers heat from the water to the refrigerant, and outputs chilled water at an outlet 132. It is contemplated that a number of particular types of evaporators may be utilized, including dry expansion evaporators, flooded type evaporators, bare tube evaporators, plate surface evaporators, and finned evaporators among others.

HVACR system 100 further includes a controller 160 which outputs control signals to variable frequency drive 155 to control operation of the motor 170 and compressor 110. Controller 160 also receives information about the operation of drive unit 150. In exemplary embodiments controller 160 receives information relating to motor current, motor terminal voltage, and/or other operational characteristics of the motor. It shall be appreciated that the controls, control routines, and control modules described herein may be implemented using hardware, software, firmware and various combinations thereof and may utilize executable instructions stored in a non-transitory computer readable medium or multiple non-transitory computer readable media. It shall further be understood that controller 160 may be provided in various forms and may include a number of hardware and software modules and components such as those disclosed herein.

Figure 2:
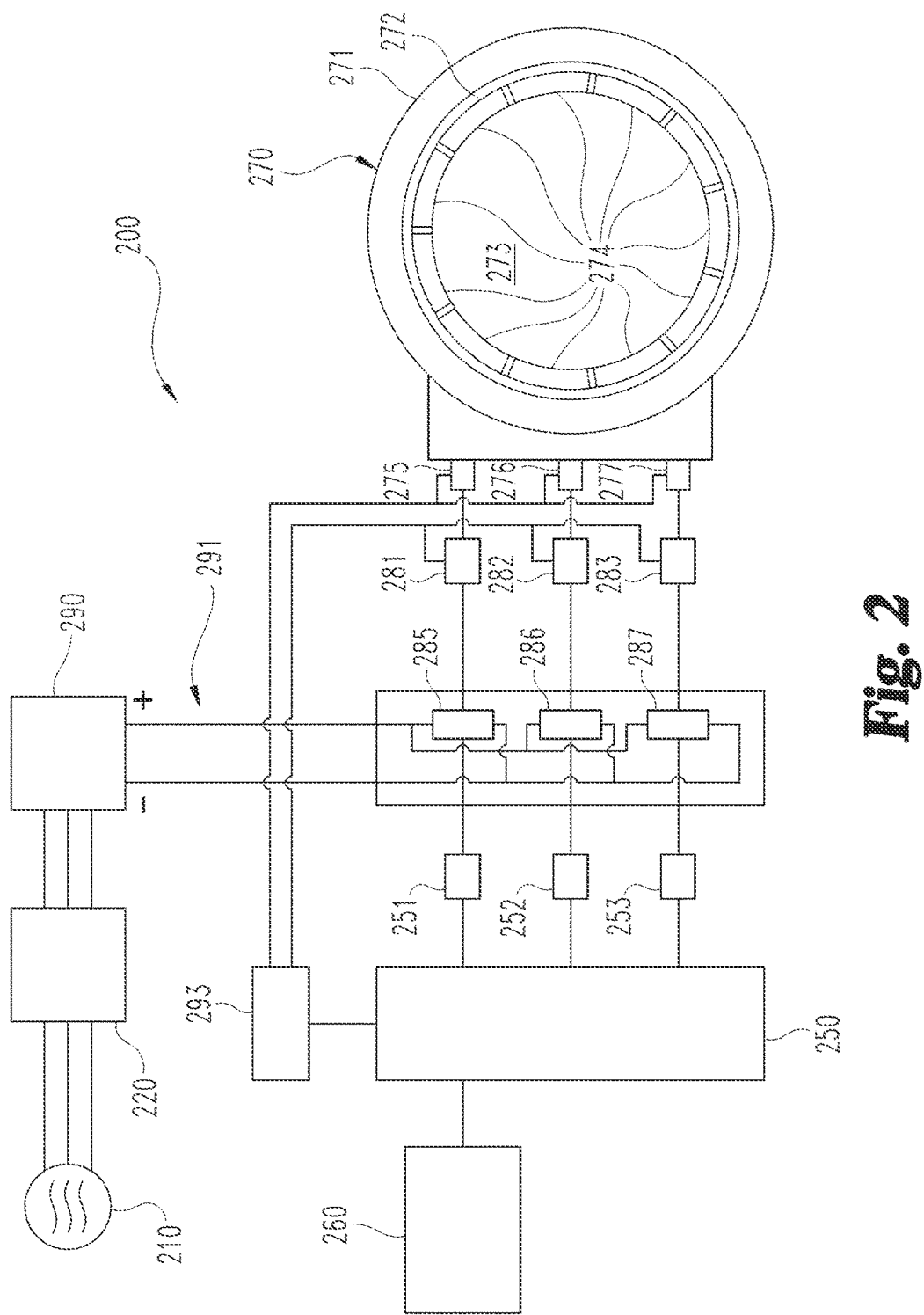
FIG. 2 is a schematic illustration of an exemplary variable frequency drive configured to drive an electric motor.

With reference to FIG. 2 there is illustrated an exemplary circuit diagram for a variable frequency motor drive 200. Drive 200 is connected to a power source 210, for example, a 400/480 VAC utility power supply which provides three-phase AC power to line filter module 220. Line filter module 220 is configured to provide harmonic damping to mitigate losses which can arise from harmonic feedback from drive components to power source 210. Line filter module 220 outputs three-phase AC power to a rectifier 290 which converts the AC power to DC power and provides the DC power to a DC bus 291. DC bus 291 is preferably a film capacitor-cased bus which includes one or more film capacitors electrically coupled between positive and negative bus rails. DC bus 291 is connected to inverter 280. For clarity of illustration and description, rectifier 290, DC bus 291, and inverter 280 are shown as discrete elements. It shall be appreciated, however, that two or more of these components may be provided in a common module, board or board assembly which may also include a variety of additional circuitry and components. It shall be further understood that, in addition to the illustrated 6-pulse rectifier, other multiple pulse rectifiers such as 12-pulse, 18-pulse, 24-pulse or 30-pulse rectifiers may be utilized along with phase shifting transformers providing appropriate phase inputs for 6-pulse 12-pulse, 18-pulse, 24-pulse, or 30-pulse operation.

Inverter module 280 includes switches 285, 286 and 287 which are connected to the positive and negative rails of DC bus 291. Switches 285, 286 and 287 are preferably configured as IGBT and diode based switches, but may also utilize other types of power electronics switching components such as power MOSFETs or other electrical switching devices. Switches 285, 286 and 287 provide output to motor terminals 275, 276 and 277. Current sensors 281, 282 and 283 are configured to detect current flowing from inverter module 280 to motor 270 and send current information to ID module 293. Voltage sensors are also operatively coupled with motor terminals 275, 276 and 277 and configured to provide voltage information from the motor terminals to ID module 293.

ID module 293 includes burden resistors used in connection with current sensing to set the scaling on current signals ultimately provided to analog to digital converters for further processing. ID module 293 tells the VFD what size it is (i.e. what type of scaling to use on current post ADC) using identification bits which are set in hardware on the ID module 293. ID module 293 also outputs current and voltage information to gate drive module 250 and also provides identification information to gate drive module 250 which identifies the type and size of the load to which gate drive module 250 is connected. ID module 293 may also provide current sensing power supply status information to gate drive module 250. ID module 293 may also provide scaling functionality for other parameters such as voltage or flux signals in other embodiments.

Gate drive module 250 provides sensed current and voltage information to analog to digital converter inputs of DSP module 260. DSP module 260 processes the sensed current and voltage information and also provides control signals to gate drive module 250 which control signals gate drive module 250 to output voltages to boost modules 251, 252 and 253, which in turn output boosted voltages to switches 285, 286 and 287. The signals provided to switches 285, 286 and 287 in turn control the output provided to terminals 275, 276 and 277 of motor 270.

Motor 270 includes a stator 271, a rotor 273, and an air gap 272 between the rotor and the stator. Motor terminals 275, 276 and 277 are connected to windings provided in stator 271. Rotor 273 includes a plurality of permanent magnets 274. In the illustrated embodiment magnets 274 are configured as surface permanent magnets positioned about the circumference of rotor 273. The rotor is typically constructed using the permanent magnets in such a way as essentially a constant magnetic flux is present at the surface of the rotor. In operation with rotation of the rotor, the electrical conductors forming the windings in the stator are disposed to produce a sinusoidal flux linkage. Other embodiments also contemplate the use of other magnet configurations such as interior magnet configurations, as well as inductance motor configurations, reluctance motor configurations and other non-permanent magnet configurations.

Figure 3:
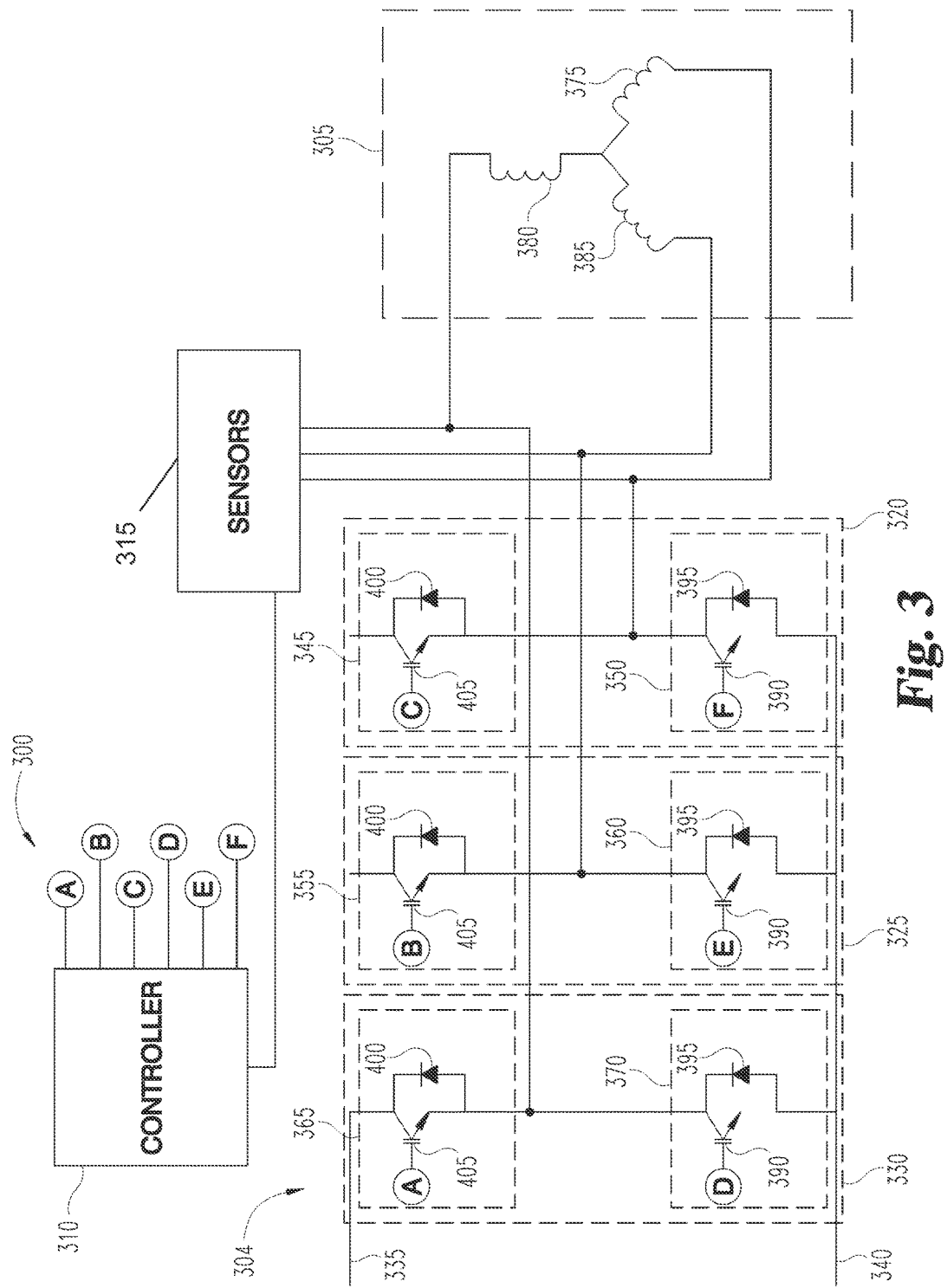
FIG. 3 is a schematic illustration of another exemplary variable frequency drive configured to drive an electric motor.

With reference to FIG. 3 there is illustrated schematic diagram 300 including a variable frequency drive 304 configured to drive an electric motor 305, a controller 310, and voltage and current sensors 315. Variable frequency drive 304 includes a first-phase inverter leg 320, a second-phase inverter leg 325, a third-phase-inverter leg 330, a first DC bus 335 and a second DC bus 340. The first-phase inverter leg 320 has an upper switching element 345 and a lower switching element 350, both of which are electrically connected in a series relationship between the first DC bus 335 and the second DC bus 340. The second-phase inverter leg 325 has an upper switching element 355 and a lower switching element 360, both of which are electrically connected in a series-type relationship between the first DC bus 335 and the second DC bus 340. The third-phase inverter leg 330 has an upper switching element 365 and a lower switching element 370, both of which are electrically connected in a series-type relationship between the first DC bus 335 and the second DC bus 340. The inverter legs 320, 325, and 330 described above are also referred to as inverter branches. In other embodiments various other inverter configurations are used.

Electric motor 305 is illustrated as a three-phase electric motor connected in a wye configuration, however, other configurations such as delta configuration are also possible. A first phase winding 375 of motor 305 is connected between the upper and lower switching elements 345 and 350. A second phase winding 380 of motor 305 is connected between the upper and lower switching elements 365 and 370. A third phase winding 385 of motor 305 is connected between the upper and lower switching elements 355 and 360.

Each lower switching element 350, 360, and 370 includes a transistor 390 which, in the illustrated embodiment, is an insulated gate bipolar transistor (IGBT) having a collector coupled to a respective upper switching element 345, 355, or 365 and an emitter coupled to the second DC bus 340. Each lower switching element 350, 360, and 370 also includes a diode 395 having a cathode coupled to the respective upper switching element 345, 355, or 365, and an anode coupled to the second DC bus 340. The upper switching elements 345, 355, and 365 each include a respective diode 400 having an anode coupled to the respective lower switching elements 350, 360, and 370, and a cathode coupled to the first DC bus 335. Each of the upper switching elements 345, 355, and 365 include a transistor 405 (e.g., an IGBT) having an emitter connected to the respective lower switching element 350, 360, and 370, and a collector coupled to the DC bus 335.

The switching elements 345, 350, 355, 360, 365, and 370 are controlled by the controller 310 to turn the motor 305. In the construction shown, the sensors 315 sense the current through each of the windings 375, 380, 385 and the terminal voltage at each of the motor terminals and provides an indication of the sensed current and voltage to the controller 310. The controller 310 powers the windings 375, 380, and 385 to rotate the motor 305. The controller 310 chooses which phase windings to power based on the voltage readings sensed by the voltage sensor. During operation, the controlled turning on and off of the switches causes the motor to rotate in a forward direction, resulting in the motor 305 driving the compressor 105.

Figure 4:
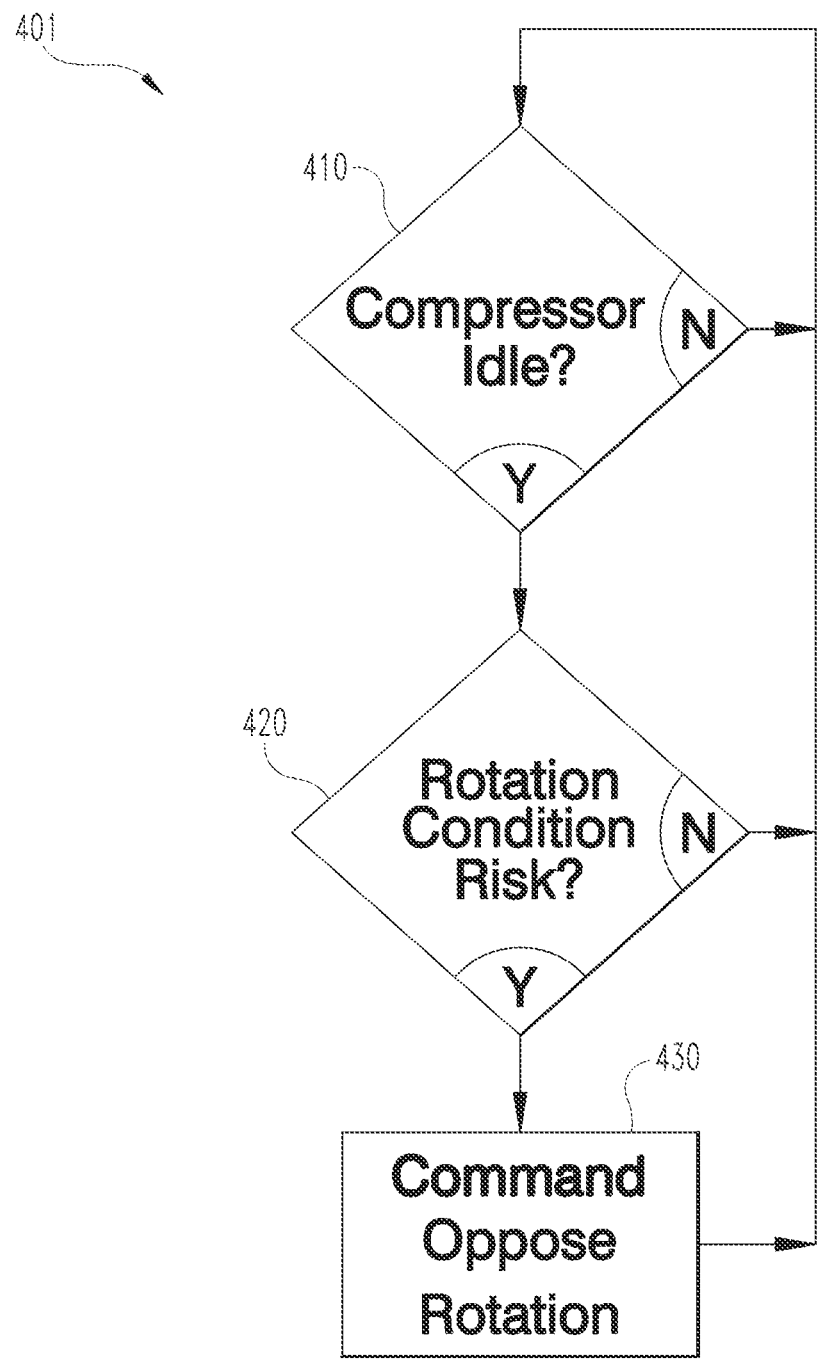
FIG. 4 is a flow diagram illustrating an exemplary control process.

With reference to FIG. 4 there is illustrated an exemplary control process 401 for opposing, limiting, and/or preventing undesired and/or un-commanded compressor rotation. Process 401 begins at conditional 410 which evaluates whether a compressor idle condition exists. This may be performed by evaluating the physical state of the compressor, for example, identifying a non-rotating or stationary state, identifying the physical or electrical state of the motor, for example, identifying a non-rotating or stationary state physical or electrical state, evaluating the state of the electrical drive configured to drive the motor, for example, identifying when a control state or command is configured not to operate the drive, or through combinations of these techniques and/or other techniques. If conditional 410 evaluates false, process 401 returns to conditional 410 which repeats.

If conditional 410 evaluates true, process 401 proceeds to conditional 420. Conditional 420 evaluates whether an undesired and/or un-commanded rotation condition risk is present. This may be accomplished with a variety of techniques. Certain techniques evaluate the pressure upstream of the compressor. Certain techniques evaluate the pressure downstream of the compressor. Certain techniques evaluate the pressure differential across the compressor. Certain techniques evaluate pressure and/or temperature conditions at other system locations. Certain techniques evaluate environmental conditions associated with a risk of undesired compressor rotation. Such techniques include, for example, detecting rotation of the compressor or of the rotor of the motor with one or more sensors, detecting back EMF potential (or current induced by the same) at the motor terminals which also indicates rotations, or detecting information of other system parameters predetermined to be associated with a risk of undesired or un-commanded compressor rotation. Certain techniques utilize combinations of the aforementioned and/or other techniques.

Regardless of the particular information or parameters utilized to assess risk of an undesired and/or un-commanded rotation condition, conditional 420 may be configured to compare the information or parameters to one or more criteria to identify a risk of undesired compressor rotation. This may be accomplished using a variety of techniques including, for example, look up tables, threshold comparisons, computational techniques, statistical techniques, other predictive techniques, or combinations of these and/or other techniques. If conditional 420 evaluates false, process 401 returns to conditional 410.

If conditional 420 evaluates true, process 401 proceeds to operation 430 which commands an operation to oppose, limit, and/or prevent undesired compressor rotation. Operation 430 may comprise a number of techniques. In certain embodiments, operation 430 may control a power supply such as a drive to provide a closed circuit or short circuit condition effective to dissipate current induced by motor rotation to oppose rotation of a motor coupled with a compressor. In certain embodiments the closed or short circuit condition may be provided by commanding two or more switches, such as two or more of switches 345, 350, 355, 360, 365, and 370, to a close configuration to provide a short circuit to a drive rail, such as rail 335 or 340 including two or more motor windings, such as two or more of motor windings 375, 380 and 385.

In certain other embodiments operation 430 may control a power such as a drive to provide a DC current to a motor effective to urge the motor toward a predetermined configuration effective to oppose, limit, and/or prevent undesired compressor rotation. For example, with reference to FIG. 3, controller 310 could command switching elements 345 and 325 to close providing a closed circuit DC bus rail 335, through motor windings 380 and 385 and to DC bus rail 340. A variety of other closed circuit configurations involving different combinations of switches and motor windings may also be employed.

Figure 5:
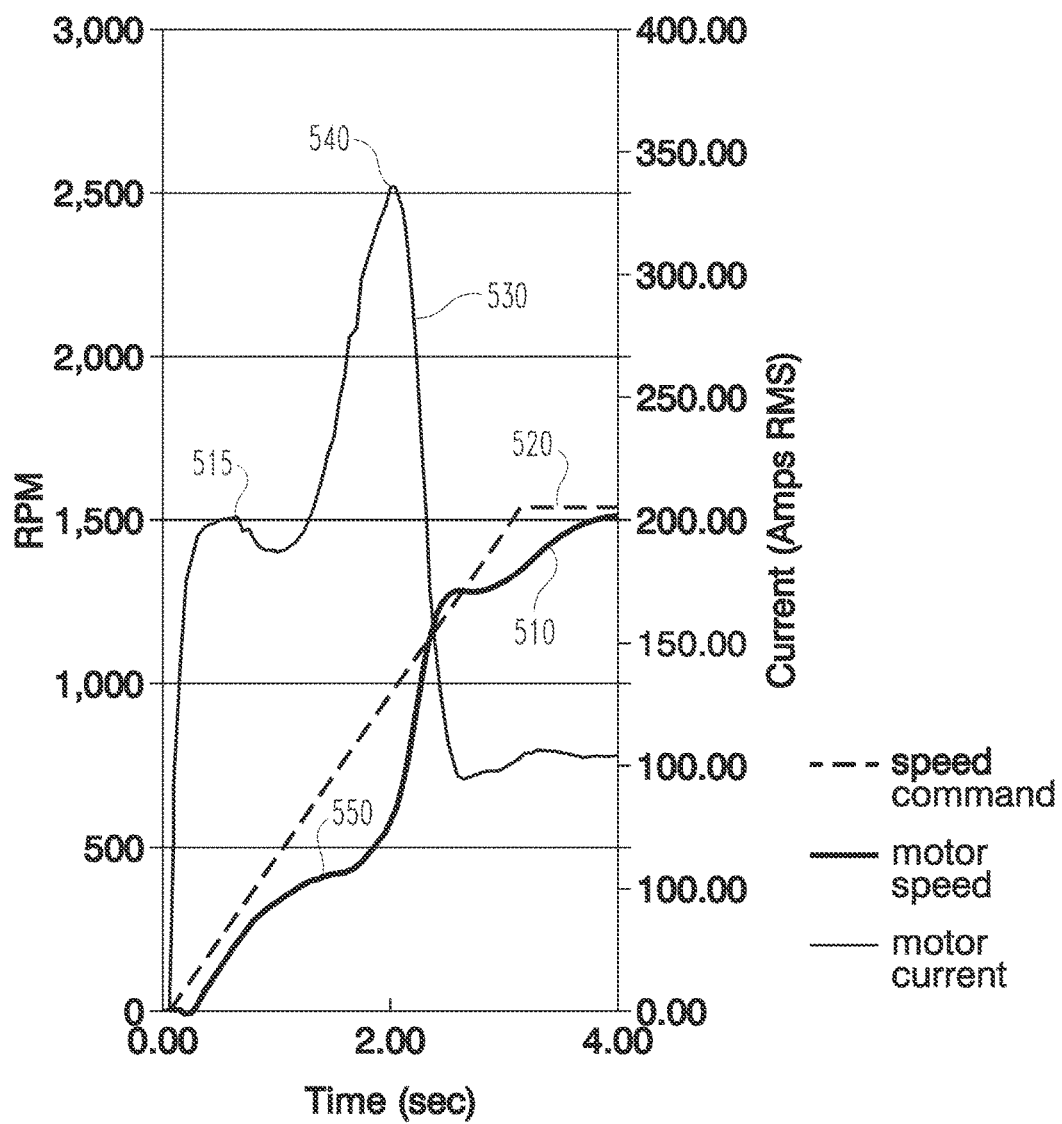
FIG. 5 is a graphical illustration of one approach for starting the refrigerant compressor of the system of FIG. 1.

FIG. 5 provides a graphical illustration of one approach for starting compressor 110. This approach does not include any particular aspect directed to any liquid clearing function in order to avoid damage to compressor 110 and/or other components of system 100. Further, in illustrated form, compressor 110 includes liquid which has not been removed therefrom before this approach is implemented. Upon activation of compressor 110, current 530 of motor 170 has an initial start profile that forms a peak 515 at 200 ARMS, although other values are possible. This initial start profile of current 530 is predetermined, and allows VFD 155 to determine its speed and rotor position. Following peak 515, current 530 of motor 170 undergoes a small decrease as operation of motor 170 is switched to follow speed command 520. In order to achieve speed 510 of motor 170 over a set period of time that generally corresponds to the speed trajectory of speed command 520 provided by controller 160, the current 530 of motor 170 undergoes a spike event 540. Spike event 540 occurs, in part, due to the relatively high amount of torque that motor 170 must create in order to drive the collected liquid(s) from compressor 110 so that speed 510 of motor 170 may generally meet or correspond to the speed trajectory of speed command 520. Controller 160 controls operation of variable frequency drive 155 in order to provide motor 170 with the necessary voltage and/or PWM drive signal required to create sufficient torque of motor 170 to clear collected liquid(s) and otherwise increase speed 510 of motor 170 to match the speed trajectory of speed command 520.

In the illustrated form, the relatively high amount of torque of motor 170 in the presence of collected liquid(s) also causes deformation or deflection of components of compressor 110. More particularly, event 550 is representative of a torque induced deformation or deflection of a rotor of compressor 110 such that it rubs against the sides of the compression chamber of compressor 110. The interference between components at event 550 slows the increase of speed 510 of motor 170, causes a deviation of speed 510 from the speed trajectory of speed command 520 around event 550, and also contributes to spike event 540. As would be appreciated by those skilled in the art, spike event 540 can result in failure or increased susceptibility to failure of one or more components of system 100, including for example compressor 110 and/or motor 170. In addition, the deformation or deflection of components of compressor 110, including those associated with event 550, can result in failure or reduced lifespan of compressor 110.

Figure 6:
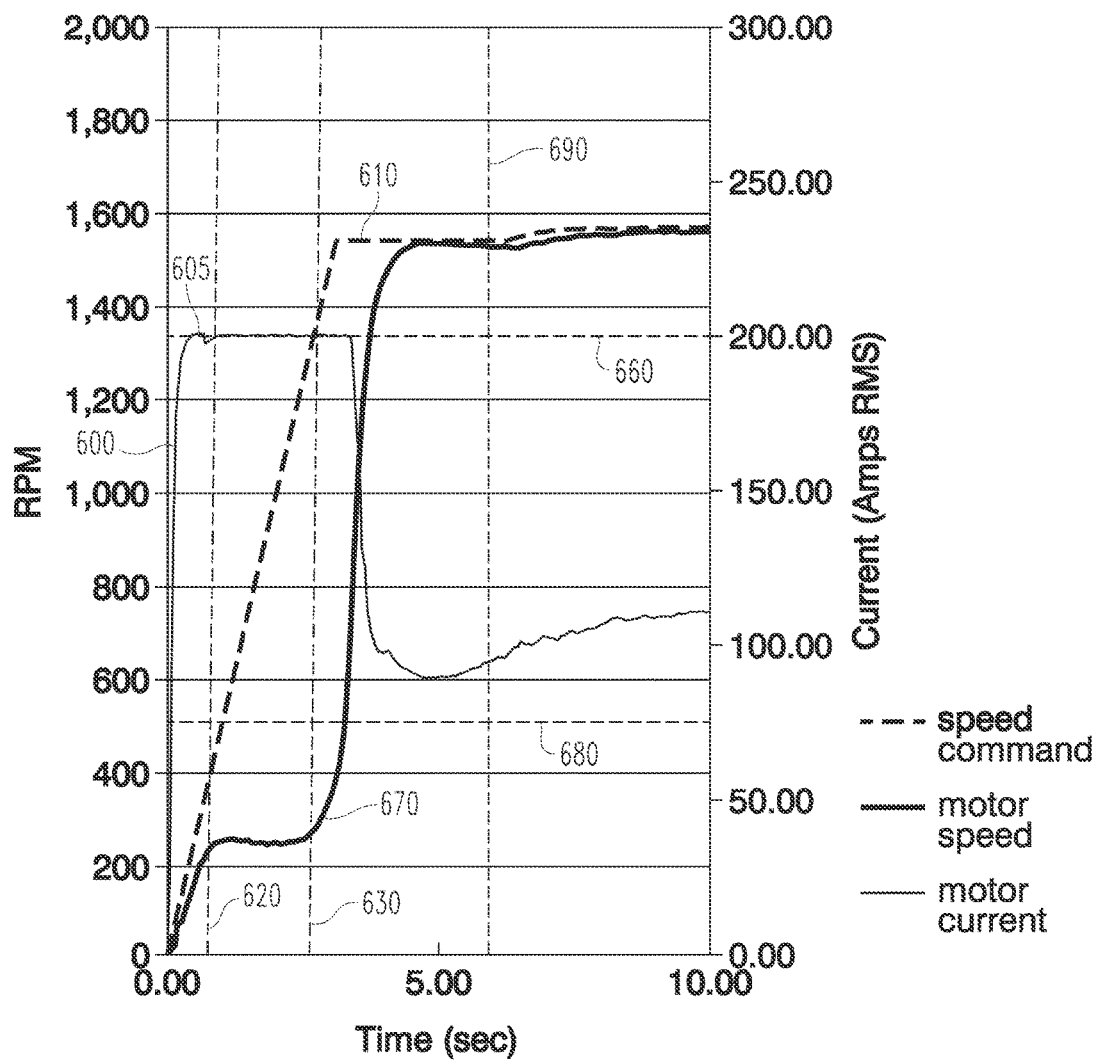
FIGS. 6-7 are graphical illustrations of another approach for starting the refrigerant compressor of the system of FIG. 1.
Figure 7:
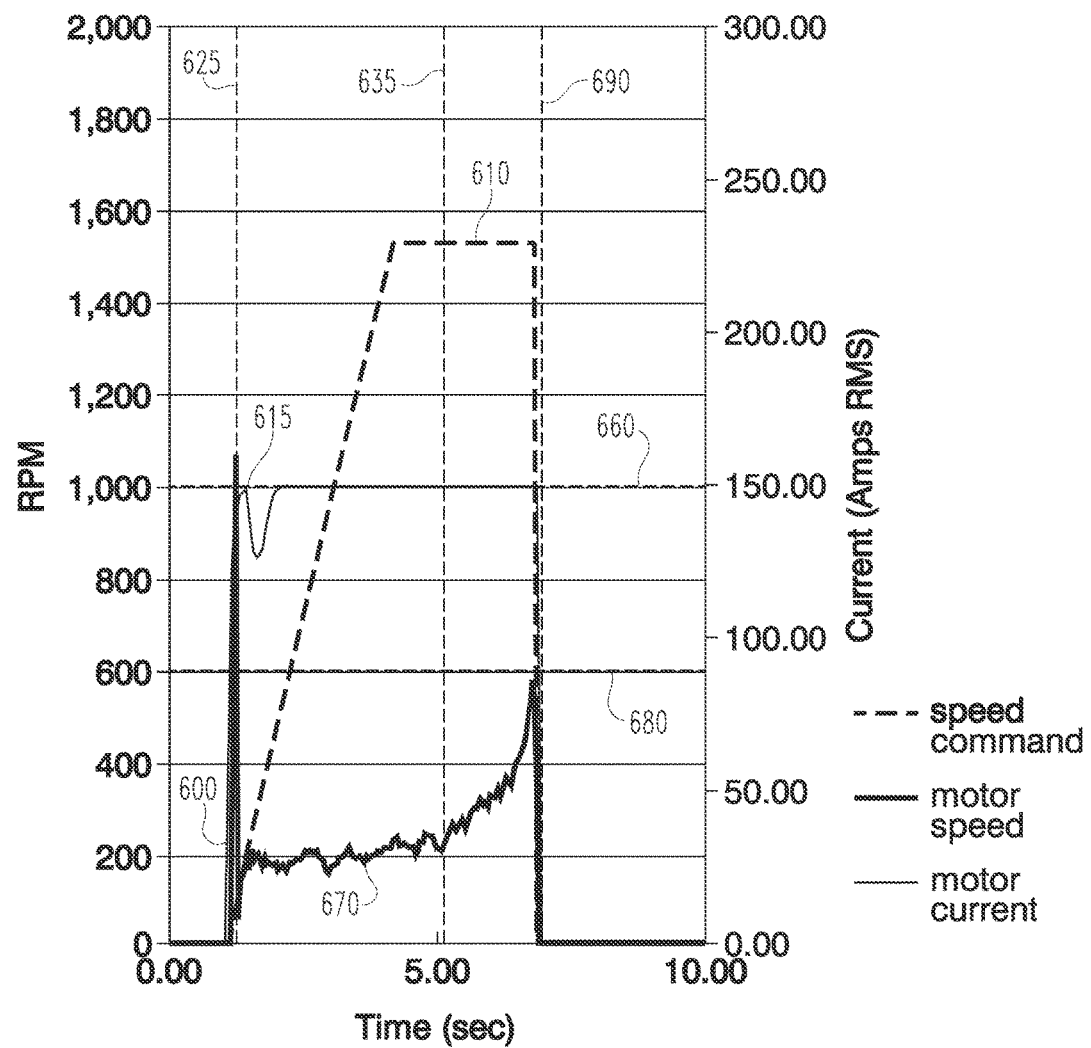

Turning now to FIGS. 6 and 7, further details of an alternative approach for starting compressor 110 will be provided. As will be discussed in greater detail below, this approach provides a liquid clearing function and controller 160 may be configured to automatically implement performance of this approach each time compressor 110 is started or in response to determining the presence of collected liquid(s) in compressor 110. For forms where this approach is performed in response to determining the presence of collected liquid(s) in compressor 110, it should be understood that an alternative approach for operating compressor 110 may be performed if the presence of collected liquid(s) in compressor 110 is not determined. For example, and without limitation, the approach for operating compressor 110 at start-up associated with FIG. 5, where the speed trajectory of speed command 520 is the controlling parameter of the operation of compressor 110 at start-up, may be implemented if the presence of collected liquid(s) in compressor 110 is not determined.

In one form, a sensor or other detection means associated with compressor 110 is configured to provide a signal to controller 160 indicative of the presence or absence of collected liquid(s) in compressor 110, and controller is 160 is responsive to this signal to implement the appropriate approach for operation of compressor 110 at start-up. In certain forms, the sensor or other detection means is configured to provide the signal indicative of the presence or absence of collected liquid(s) in compressor 110 to controller 160 before compressor 110 is started. Similarly, it should be appreciated that controller 160 may be configured to select and/or implement the appropriate approach for operation of compressor 110 at start-up before compressor 110 is started. In another form, the presence of collected liquid(s) in compressor 110 is determined if the torque of motor 170 exceeds a predetermined value within a predefined period of time following start-up of compressor 110. Torque of motor 170 may be measured by any suitable means including appropriately configured sensors. In one particular but non-limiting form, torque of motor 170 is based upon measured current of motor 170 as torque and current of motor 170 are generally directly proportional to one another at low speeds of motor 170. In one form, the current value used for determining torque of motor 170 is measured simultaneously with the activation of motor 170.

Controller 160 is configured to switch from one approach for operating compressor 110 to another approach for operating compressor 110 if the torque of motor 170 exceeds the predetermined value within the predefined period of time. By way of non-limiting example, controller 160 may be configured to initially start compressor 110 using the approach illustrated and described in connection with FIG. 5 and then switch to the approach associated with FIGS. 6 and 7 if the torque of motor 170 exceeds the predetermined value within the predefined period of time. Similarly, it should be appreciated that a slight delay might exist after start-up of compressor 110 before the approach associated with FIGS. 6 and 7 is implemented. Alternatively, controller 160 may be configured to initially start compressor 110 using the approach associated with FIGS. 6 and 7 and then switch to the approach associated with FIG. 5 for example if the torque of motor 170 does not exceed the predetermined value within the predefined period of time. In one form, the predetermined value for torque of motor 170 corresponds to known torque values for motor 170 measured upon activation of compressor 110 when compressor 110 is started without any liquid(s) collected therein.

In the approach associated with FIGS. 6 and 7, controller 160 is configured to operate compressor 110 in a first or start-up mode which prevents motor 170 from exceeding a predetermined current limit 660 unless speed 670 of motor 170 exceeds predetermined speed threshold 680 at or before time 690. In one form, predetermined current limit 660 corresponds to a maximum current rating for motor 170 during operation of compressor 110 with the speed of motor 170 at or under the speed of predetermined speed threshold 680 in order to avoid damage or potential damage to compressor 110. Controller 160 is configured to control operation of variable frequency drive 155 such that motor 170 is provided with an appropriate voltage and/or PWM drive signal that prevents current 600 of motor 170 from exceeding limit 660 before time 690 regardless of the torque required of motor 170 in order to make speed 670 of motor 170 correspond to or meet the speed trajectory of speed command 610. In response to speed 670 exceeding predetermined speed threshold 680 at or before time 690, controller 160 is further configured to operate compressor 110 in a second mode or run mode which generally does not limit or prevent current 600 of motor 170 from exceeding predetermined current limit 660. In the event speed 670 of motor 170 does not exceed predetermined speed threshold 680 at or before time 690, controller 160 is further configured to stop operation of compressor 110.

With more particular reference to FIG. 6, where the values for current limit 660, speed threshold 680, and time 690 are non-limiting and exemplary only, current 600 of motor 170 has an initial start profile that forms a peak 605 at 200 ARMS upon activation of compressor 110. This initial start profile of current 600 is predetermined, and allows VFD 155 to determine its speed and rotor position. Other variations in the initial start profile of current 600 are possible. Following peak 605, current 600 of motor 170 undergoes a small decrease as operation of motor 170 is switched to a mode which prevents motor 170 from exceeding predetermined current limit 660 unless speed 670 of motor 170 exceeds predetermined speed threshold 680 at or before time 690. Current limit 660 is set to limit current of motor 170 from exceeding 200 ARMS before time 690. In this manner, speed 670 of motor 170 initially increases and then holds steady at about 250 RPM generally between times 620 and 630. During this period of time, speed 670 of motor 170 remains relatively low and facilitates the steady clearance of liquid(s) from compressor 110 without the creation of relatively high motor torque or motor current. As a result, damage or failure of compressor 110, motor 170 or one or more other components of system 100 as discussed above in connection with the approach associated with FIG. 5 may be avoided. Following clearance of liquid(s) from compressor 110 around time 630, speed 670 of motor 170 increases until it generally matches or corresponds to the speed trajectory of speed command 610. Further, shortly after time 630, current 600 of motor 170 decreases as speed 670 of motor 170 increases.

Referring more particularly to FIG. 7, current 600 of motor 170 has an initial start profile that forms a peak 615 at 150 ARMS upon activation of compressor 110. This initial start profile of current 600 is predetermined, and allows VFD 155 to determine its speed and rotor position. Other variations in the initial start profile of current 600 are possible. Following peak 605, current 600 of motor 170 undergoes a small decrease as operation of motor 170 is switched to a mode which prevents motor 170 from exceeding predetermined current limit 660 unless speed 670 of motor 170 exceeds predetermined speed threshold 680 at or before time 690. Current limit 660 is set to limit current of motor 170 from exceeding 150 ARMS before time 290. It should be understood that the values for current limit 660, speed threshold 680, and time 690 in FIG. 7 are non-limiting and exemplary only, and while different from those set forth in FIG. 6 could correspond to those set forth in FIG. 6.

In FIG. 7, speed 670 of motor 170 initially spikes to above 1,000 RPM as motor current 600 reaches current limit 660 and then quickly dives to around 200 RPM between time 625 and time 635. The initial spike in speed 670 of motor 170 is noise which controller 160 can be configured to disregard or filter. After time 635, speed 670 of motor 170 begins to increase but does not exceed speed threshold 680 set at 600 RPM at or before time 690, which represents the end of a six second period of time following start of compressor 160. In response to the failure of speed 670 of motor 170 to exceed speed threshold 680 at or before time 690, operation of compressor 110 is stopped. After being stopped, it is contemplated that one or more restarts of compressor 110 could be attempted after passage of a predetermined period of time, or an indication could be provided to an operator of system 100 to manually drain compressor 110 or take other actions to clear liquid(s) from compressor 110. Alternatively, controller 160 may be further configured to automatically activate opening of a drain valve on compressor 110 or take other liquid clearing action(s) in the event speed 670 of motor 170 does not exceed speed threshold 680 at or before time 690. It should also be appreciated that, in addition to or in lieu of implementing the approach associated with FIGS. 6 and 7, controller 160 may be configured to implement one or more of these actions upon determining the presence of liquid(s) in compressor 110 as discussed above.

As mentioned above, controller 160 can be configured to disregard or filter the initial spike in speed 670 of motor 170 so that the same is not considered to be a speed of motor 170 above speed threshold 680 at or before time 690 that is necessary to prevent stopping operation of compressor 110. For example, in one form controller 160 may be configured to disregard speed 670 of motor 170 until some predetermined time after current 600 of motor 170 reaches current limit 660 and/or if speed 670 of motor 170 is decreasing as is the case following the initial spike of speed 670, each of which would exclude consideration of the initial spike of speed 670 of motor 170. Alternatively, controller 160 could disregard speed 670 of motor 170 until a predetermined period of time has passed following starting of compressor 110 where the period of time is calculated to exclude the initial spike of speed 670. Still, another approach for disregarding this initial spike of speed 670 may involve controller 160 being additionally or alternatively configured to determine that speed 670 of motor 170 has exceeded speed threshold 660 once speed 670 has been consistently maintained above speed threshold 660 for a certain period of time. It should be appreciated however that other approaches are possible for eliminating or disregarding consideration of the initial spike of speed 670 of motor 170.

Figure 8:
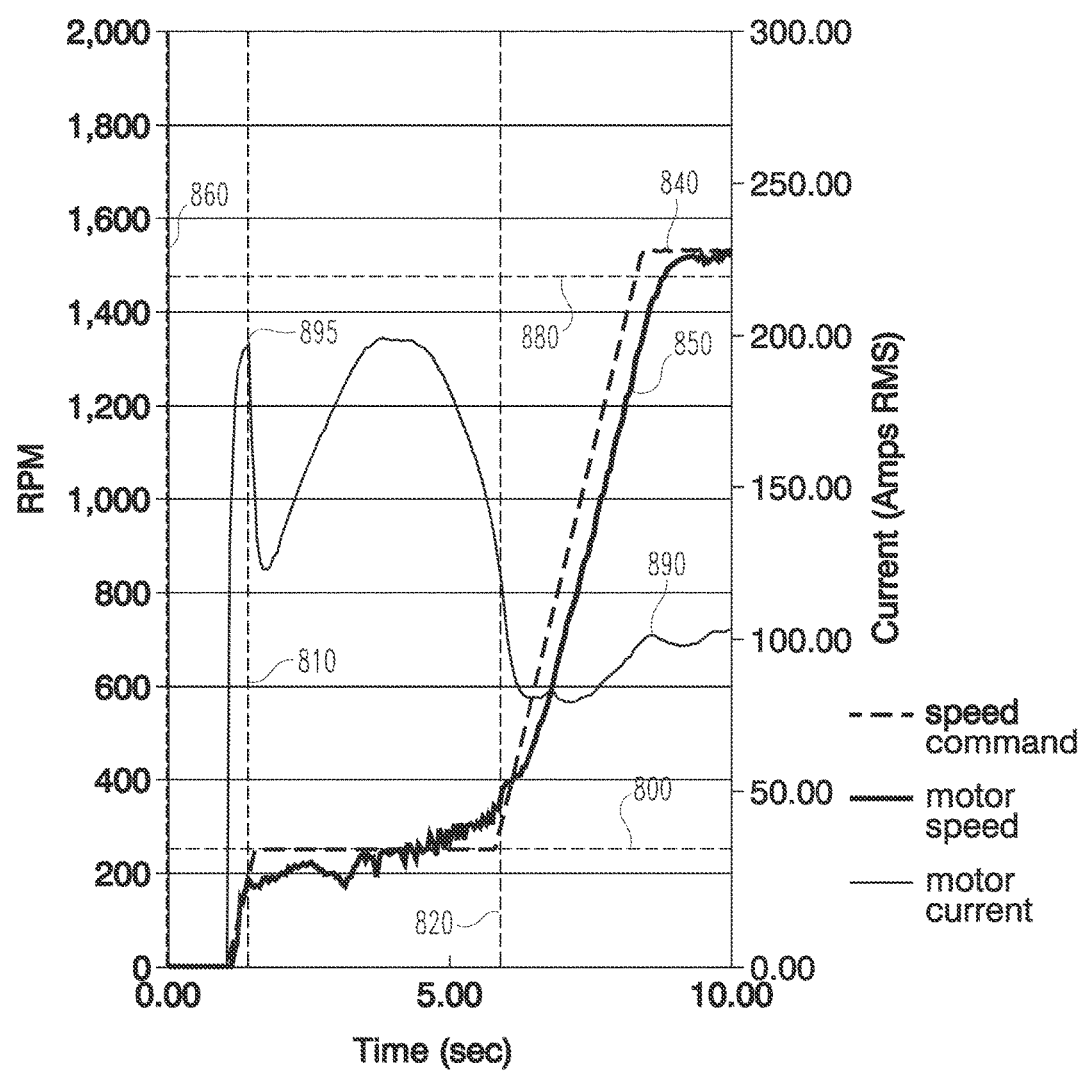
FIG. 8 is a graphical illustration of yet another approach for starting the refrigerant compressor of the system of FIG. 1.

Turning now to FIG. 8, further details of an alternative approach for starting compressor 110 will be provided. As will be discussed in greater detail below, this approach provides a liquid clearing function and controller 160 may be configured to automatically implement performance of this approach each time compressor 110 is started or in response to determining the presence of collected liquid(s) in compressor 110. For forms where this approach is performed in response to determining the presence of collected liquid(s) in compressor 110, it should be understood that an alternative approach for operating compressor 110 may be performed if the presence of collected liquid(s) in compressor 110 is not determined. For example, and without limitation, the approach for operating compressor 110 at start-up described in connection with FIG. 5 may be implemented if the presence of collected liquid(s) in compressor 110 is not determined.

In one form, a sensor or other detection means associated with compressor 110 is configured to provide a signal to controller 160 indicative of the presence or absence of collected liquid(s) in compressor 110, and controller is 160 is responsive to this signal to implement the appropriate approach for operation of compressor 110 at start-up. In certain forms, the sensor or other detection means is configured to provide the signal indicative of the presence or absence of collected liquid(s) in compressor 110 to controller 160 before compressor 110 is started. Similarly, it should be appreciated that controller 160 may be configured to select and/or implement the appropriate approach for operation of compressor 110 at start-up before compressor 110 is started. In another form, the presence of collected liquid(s) in compressor 110 is determined if the torque of motor 170 exceeds a predetermined value within a predefined period of time following start-up of compressor 110. Torque of motor 170 may be measured or determined as discussed herein above, and controller 160 is configured to switch from one approach for operating compressor 110 to another approach for operating compressor 110 if the torque of motor 170 exceeds the predetermined value within the predefined period of time. By way of non-limiting example, controller 160 may be configured to initially start compressor 110 using the approach illustrated and described in connection with FIG. 5 and then switch to the approach associated with FIG. 8 if the torque of motor 170 exceeds the predetermined value within the predefined period of time. Similarly, it should be appreciated that a slight delay might exist after start-up of compressor 110 before the approach associated with FIG. 8 is implemented. Alternatively, controller 160 may be configured to initially start compressor 110 using the approach associated with FIG. 5 and then switch to the approach associated with FIG. 5 for example if the torque of motor 170 does not exceed the predetermined value within the predefined period of time. In one form, the predetermined value for torque of motor 170 corresponds to known torque values for motor 170 measured upon activation of compressor 110 when compressor 110 is started without any liquid(s) collected therein.

In the approach associated with FIG. 8, controller 160 is configured to operate compressor 110 to follow a speed command 840 provided by controller 160 which includes a speed trajectory that is configured to prevent speed 850 of motor 170 from exceeding a predetermined limit 800 from initial starting at time 860 to time 820. In this approach, controller 160 is configured to control operation of variable frequency drive 155 such that motor 170 is provided with an appropriate voltage and/or PWM drive signal that allows or facilitates speed 850 of motor 170 to generally match or correspond to the speed trajectory of speed command 840. A current limit 880 is also set for current 890 of motor 170 and controller 160 is configured to stop operation of compressor 110 if current 890 exceeds limit 880 before time 820. In certain forms, controller 160 may also be configured to stop operation of compressor 110 if current 890 exceeds limit 880 after time 820.

With more particular reference to FIG. 8, where the values for current limit 880, speed limit 800, and time 820 are non-limiting and exemplary only, current 890 of motor 170 has an initial start profile that forms a peak 895 at 200 ARMS upon activation of compressor 110. This initial start profile of current 890 is predetermined, and allows VFD 155 to determine its speed and rotor position. Other variations in the initial start profile of current 890 are possible. Following peak 895, current 890 of motor 170 decreases briefly as operation of motor 170 is switched to a mode configured to operate compressor 110 following speed command 840. In addition, current limit 880 is set to 225 ARMS. Between time 860 and time 810 the speed trajectory of speed command 840 initially increases from 0 RPM to the speed of speed limit 800. In the illustrated form, the speed of speed limit 800 is about 300 RPM, although it should be appreciated that other variations are possible. The speed trajectory of speed command 840 maintains constant at the speed of speed limit 800 from time 810 to time 820, and then increases over time up to about 1,500 RPM. In the illustrated form, times 810 and 820 generally correspond to about 1 and 6 seconds, respectively, after time 860, although other variations are possible.

While not previously discussed, it should be understood that the speed trajectory of speed command 840 will facilitate a clearing function of liquid(s) in compressor 110. More particularly, the operation of compressor 110 following the speed trajectory of speed command 840 will generally provide relatively low motor speeds between times 810 and 820 that facilitate clearance of liquid(s) from compressor 110 while avoiding undesirable and increased motor torque and current. Similarly, damage or failure of compressor 110, motor 170 and/or one or more other components of system 100 as discussed above in connection with the approach associated with FIG. 2 may be avoided. In particular, by limiting speed 850 of motor 170 until clearance of liquid(s) from compressor 110 is achieved, excessive torque and motor current are avoided. However, in the event current 890 of motor 170 should exceed current limit 880, controller 160 is configured to stop operation of compressor 110.

While not previously discussed, it should be understood that the speed trajectory of speed command 840 between times 810 and 820, and the length of the period of time between times 810 and 820, are selected to provide clearance of liquid(s) from compressor 110 by time 820. For example, these values could be known based on experimentation, or calculated in light of various factors such as compressor size amongst others. In one form, the speed trajectory of speed command 840 between times 810 and 820, and the length of the period of time between times 810 and 820 are determined based on known values for the volume of free space in compressor 110, the volume of the compression chamber of compressor 110, and a rate at which refrigerant leaks back into compressor 110. Using these values, a speed can be determined that will not result in damage to compressor 110, and that speed may be used to determine the number of rotations (and thus time) necessary to remove liquid(s) from compressor 110.

In addition to the above, while speed 850 of motor 170 exceeds speed limit 800 in the illustrated form, it should be understood that the speed trajectory of speed command 840 is nonetheless configured to prevent speed 850 of motor 170 from exceeding speed limit 800 until after time 820. Further, in other non-illustrated forms, the speed trajectory of speed command 340 may remain constant between times 810 and 820 at a speed that is below a targeted speed limit in order to account for any upward creep that may occur to speed 850 of motor 170 between times 810 and 820. As a corollary, forms in which the approach associated with FIG. 8 prevents speed 350 of motor 170 from exceeding a predetermined speed limit are also possible.

In certain embodiments, a controller is described performing certain operations to detect and report the reverse rotation of a compressor, or other operations. In certain embodiments, the controller forms a portion of a processing subsystem including one or more computing devices having memory, processing, and communication hardware. The controller may be a single device or a distributed device, and the functions of the controller may be performed by hardware or software.

Certain operations described herein include operations to interpret one or more parameters. Interpreting, as utilized herein, includes receiving values by any method known in the art, including at least receiving values from a datalink or network communication, receiving an electronic signal (e.g., a voltage, frequency, current, or a Pulse-Width Modulation ("PWM") signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

Figure 9:
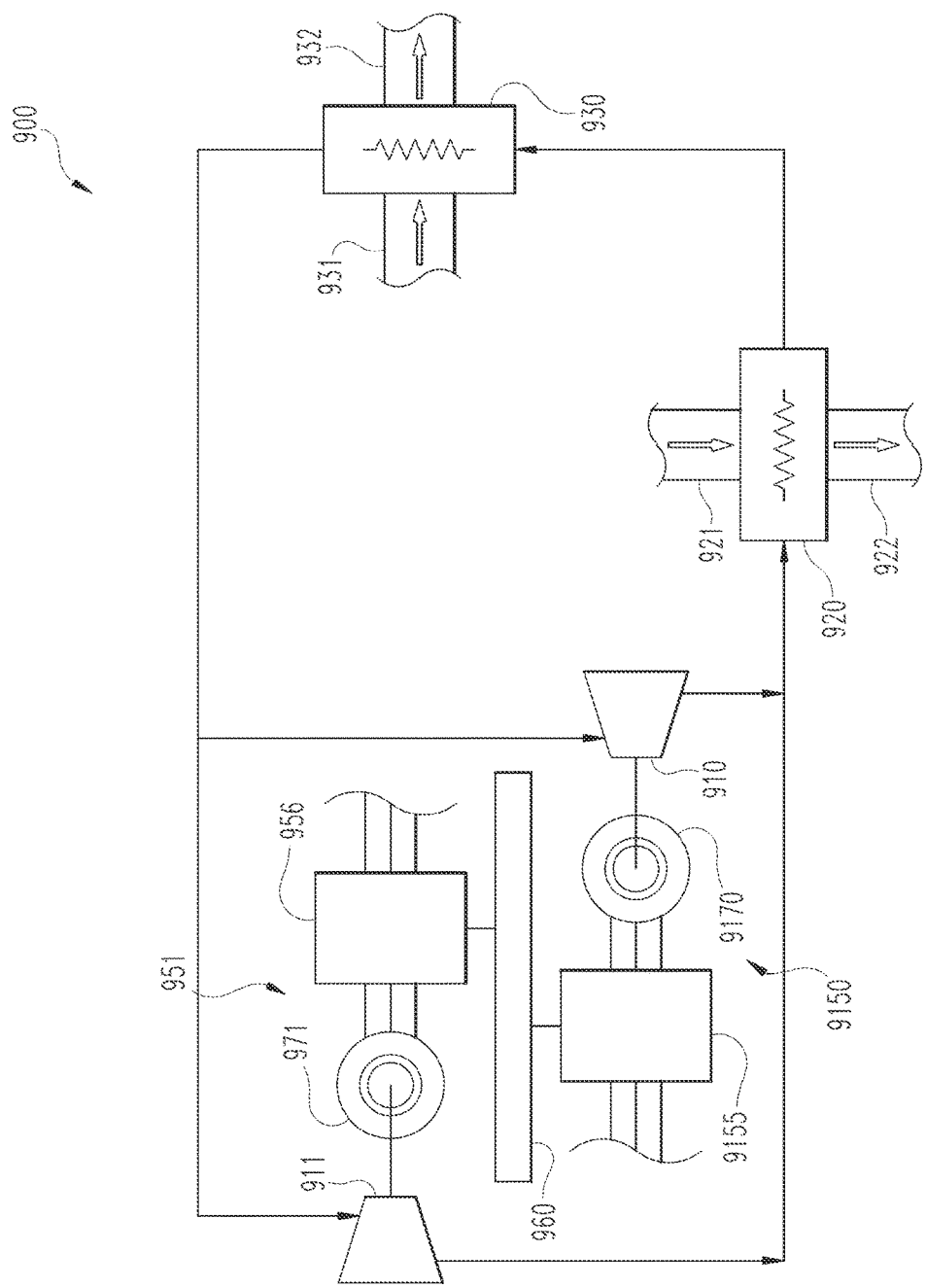
FIG. 9 is a schematic illustration of an exemplary HVACR system.

With reference to FIG. 9 there is illustrated an exemplary HVACR system 900 which includes a refrigerant loop comprising screw or scroll type compressors 910, 911, a condenser 920, and an evaporator 930. Refrigerant flows through system 900 in a closed loop from compressors 910, 911 to condenser 920 to evaporator 930 and back to compressors 910, 911. Various embodiments may also include additional refrigerant loop elements including, for example, valves for controlling refrigerant flow, refrigerant filters, economizers, oil separators and/or cooling components and flow paths for various system components.

Screw or scroll compressor 910 is driven by a drive unit 950 including a permanent magnet electric motor 970 which is driven by a variable frequency drive 155. In the illustrated embodiment, variable frequency drive 955 is configured to output a three-phase PWM drive signal, and motor 970 is a surface magnet permanent magnet motor. Use of other types and configurations of variable frequency drives and electric motors such as interior magnet permanent magnet motors, reluctance motors, or inductance motors are also contemplated. Screw or scroll compressor 911 is driven by a drive unit 951 including a permanent magnet electric motor 971 which is driven by a variable frequency drive 956. In the illustrated embodiment, variable frequency drive 956 is configured to output a three-phase PWM drive signal, and motor 971 is a surface magnet permanent magnet motor. Use of other types and configurations of variable frequency drives and electric motors such as interior magnet permanent magnet motors, reluctance motors, or inductance motors are also contemplated. It shall be appreciated that the principles and techniques disclosed herein may be applied to a broad variety of drive and motor configurations, systems and subsystems including those further described herein below. It shall be further appreciated that the same applies to a number of additional or alternate controllers, control modules or control units, including but not limited to those described elsewhere herein.

Condenser 920 is configured to transfer heat from compressed refrigerant received from compressor 910. In the illustrated embodiment, condenser 920 is a water cooled condenser which receives cooling water at an inlet 921, transfers heat from the refrigerant to the cooling water, and outputs cooling water at an output 922. It is also contemplated that other types of condensers may be utilized, for example, air cooled condensers or evaporative condensers. It shall further be appreciated that references herein to water include water solutions comprising additional constituents unless otherwise limited.

Evaporator 930 is configured to receive refrigerant from condenser 920, expand the received refrigerant to decrease its temperature and transfer heat from a cooled medium to the refrigerant. In the illustrated embodiment evaporator 930 is configured as a water chiller which receives water provided to an inlet 931, transfers heat from the water to the refrigerant, and outputs chilled water at an outlet 932. It is contemplated that a number of particular types of evaporators may be utilized, including dry expansion evaporators, flooded type evaporators, bare tube evaporators, plate surface evaporators, and finned evaporators among others.

HVACR system 900 further includes a controller 960 which outputs control signals to variable frequency drives 955, 956 to control operation of motors 970, 971 and compressors 910, 911. Controller 960 also receives information about the operation of drive units 950, 951. In exemplary embodiments controller 960 receives information relating to motor current, motor terminal voltage, and/or other operational characteristics of the motor. It shall be appreciated that the controls, control routines, and control modules described herein may be implemented using hardware, software, firmware and various combinations thereof and may utilize executable instructions stored in a non-transitory computer readable medium or multiple non-transitory computer readable media. It shall further be understood that controller 960 may be provided in various forms and may include a number of hardware and software modules and components such as those disclosed herein below.

Figure 10:
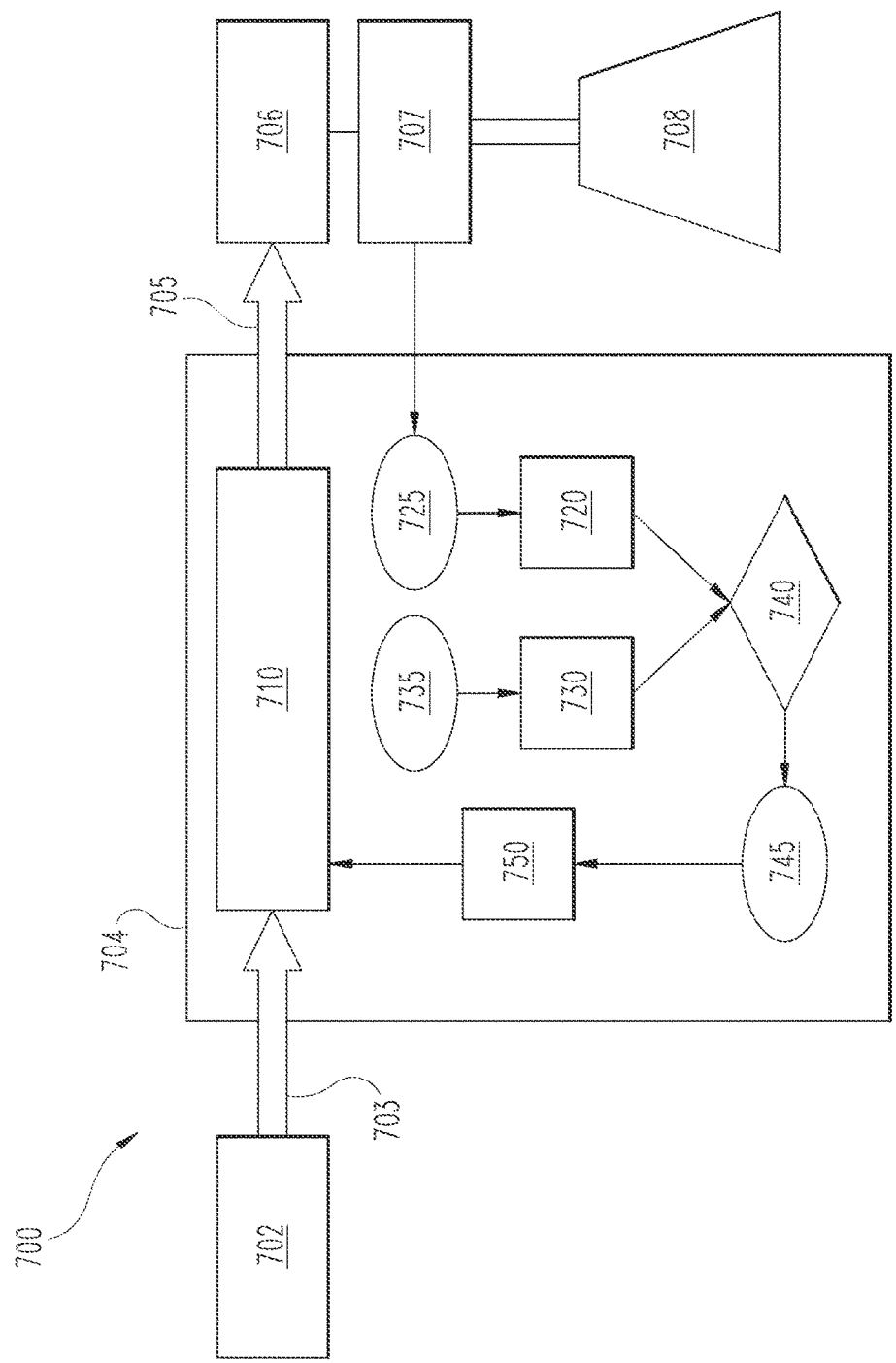
FIG. 10 is a schematic illustration of an exemplary HVACR system and flow diagram illustrating an exemplary control process.

With reference to FIG. 10, an example embodiment of a system 700 used for detecting a reverse rotation of a compressor, which may be used in a HVACR system, is provided. As shown, the system 700 may be provided with a power supply 702, which may be a mains power supply, such as described hereinabove, coupled to a controller 704, which may be coupled to a variable frequency drive 706 or components thereof, which is coupled to an electric motor 707, which is mechanically coupled to and configured to drive a compressor 708, which may be a screw or scroll compressor. The compressor 707 is designed to run or operate in one direction, which may be designated as a forward direction, with the opposite direction being a reverse direction. The reverse direction being one that subjects the compressor to potential damage.

The exemplary controller 704 is provided with several modules 710, 720, 730, 740, 750 structured to perform various tasks to detect and stop reverse rotation of a compressor 708. The controller is provided with a supply module 710 that is coupled to a power supply 702 and a variable frequency drive 706. The supply of power 703 flows from the power supply 702 to the supply module 710. The supply module 710 is structured to selectively or selectably feed power 705 to the variable frequency drive 706 to start the motor 707. The supply module 710 may do this by limiting the amount of current, voltage, or alter the frequency of the power 705. During normal operation, the supply module 710 may feed a supply of power 705, which may be a continuous supply, to the variable frequency drive 706. Thus, the supply module is structured to start the motor 707. The supply module 710 is also configured to interrupt the power supply to the variable frequency drive 706, and in turn the motor 707. The act of interrupting the power supply may include terminating the supply of current, especially when the controller 704 detects that the compressor 708 is operating in reverse.

The example controller 704 is also provided with a current detection module 720 that is structured to receive an input from a sensor and detect and determine an amount of current 725 drawn by the electric motor 706. It is appreciated that this feedback or drawn current value 725 is different than the line current being fed to the motor 707 via the supply module 710. The current detection module 720 may incorporate various detection sensors as are known in the art, which may or may not be incorporated as part of the variable frequency drive 706. As discussed hereinafter, there may likely be an initial current spike in the drawn current value at startup of the motor 706 and compressor 708. Therefore, the current detection module 720 may be structured such as to ignore this initial current spike, or to not begin monitoring the drawn current until after this initial current spike in drawn current has subsided. This may be done by not monitoring or ignoring the monitored drawn current until a predetermined time after the commencement of supplying current. It is further appreciated that the current detection module may detect any number of characteristics of the drawn current, such as, for example: a maximum characteristic, such as a current magnitude, which may be a summed or integrated current; an instantaneous rate of change or current; or a current differential.

The example controller 700 is further provided with a threshold module 730 that is structured to interpret and/or determine a drawn current threshold value 735. The drawn current threshold value 735 may be stored as a predetermined value from a memory location on a computer readable medium. Such a location may be in the controller 700 itself, and may be incorporated into the threshold detection module 730, or any other module associated with the controller 700. The drawn current threshold value 735 is a value that may be determined empirically for a given combination of motor 707 and compressor 708, and the determination of which will be described hereinafter. It is appreciated that the drawn current threshold value 735 may be any characteristic of the drawn current, but may specifically be a limit of the characteristic of that detected by the current detection module 720, which may be, for example: a maximum characteristic limit, such as a current magnitude limit, which may be a summed or integrated current; a limit of an instantaneous rate of change of current; or a current differential limit.

The controller 700 may be provided with a diagnostic module that determines a health value 745 associated with the motor 706 and compressor 708 combination. The health value is determined by comparing the drawn current value 725 to the drawn current threshold value 735 to distinguish between normal compressor operation and a current condition attributable or indicative of compressor reverse rotation. Should the drawn current value 725 be less than the drawn current threshold value 735, then the health value 745 passes. Should the drawn current value 725 be greater than or equal to the drawn current threshold value 735, then the health value 745 fails.

The example controller 700 is also provided with a control module 750 that is structured to interpret the health value 745 and send a "go/no go" signal to the supply module 710 in response to the health value 745. If the health value 745 passes, then the control module 750 sends a "go" signal to the supply module 710 an all operations proceed as normal. If the health value 745 fails, then the control module 750 sends a "no go" signal to the supply module 710 and power 705 is cut to the motor 706 and all operations cease before the compressor 708 can be damaged.

Figure 11:
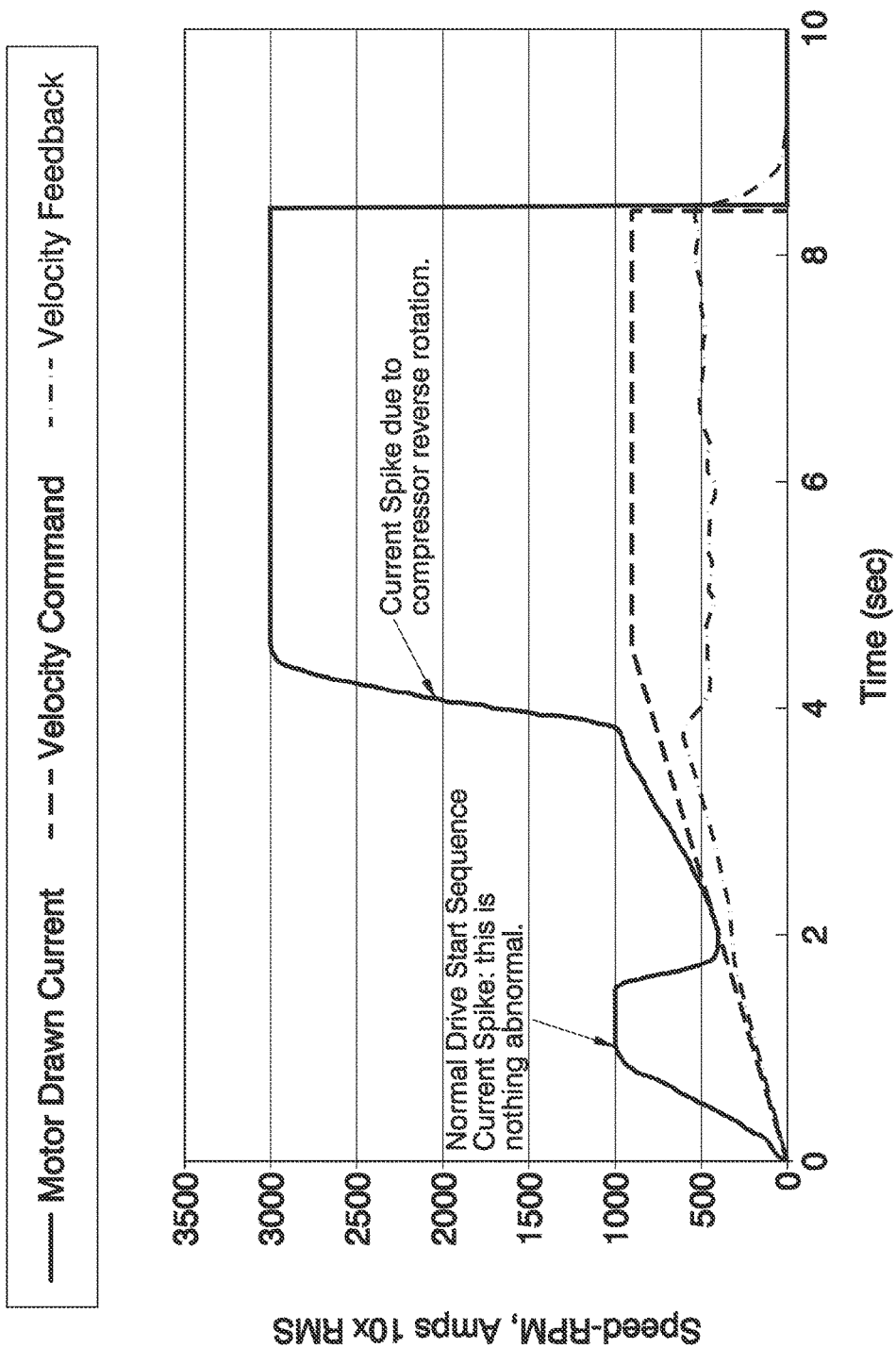
FIG. 11 is an exemplary graph representing the drawn current feedback of an exemplary HVACR system.
Figure 12:
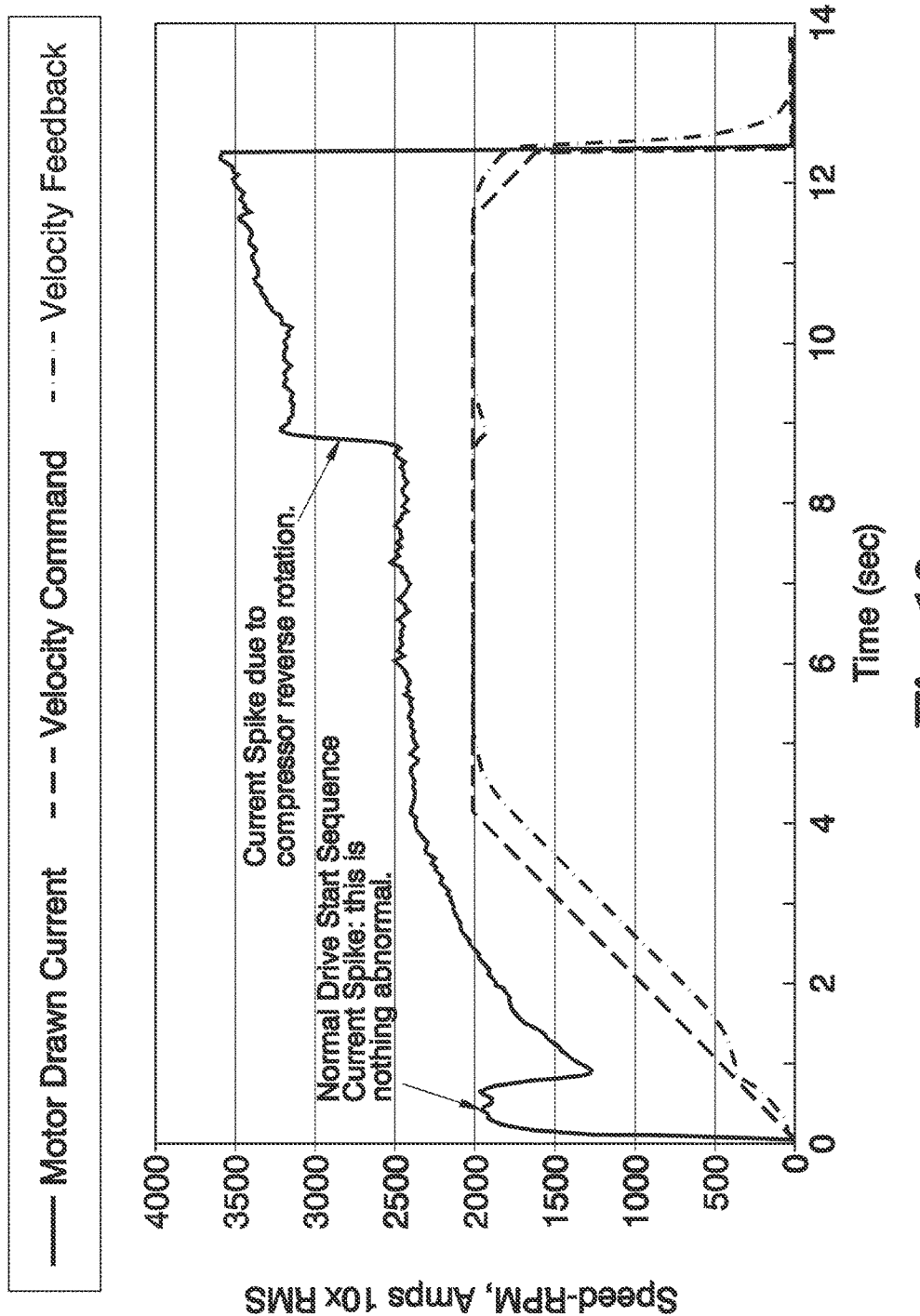
FIG. 12 is an exemplary graph representing the drawn current feedback of an exemplary HVACR system.

Referring now to FIGS. 11 and 12, example graphs are provided for two different motor and compressor combination assemblies detailing the motor drawn current value, the velocity command, and velocity feedback over time. The motor drawn current value is the drawn current value 725 as described herein, the velocity command is the velocity at which the motor is directed to rotate, and the velocity feedback is actual measured velocity at which the motor is rotating. As shown in FIGS. 11 and 12, an initial spike in motor drawn current is expected upon startup of the motor and compressor assembly. It is after this initial startup spike that the effects of motor reverse rotation are seen in the motor drawn current value. The motor draws an abnormal amount of current due to the increase torque load on the motor to keep up with the velocity command. The current drawn by the motor is proportional to the amount of torque that it produces.

Referring to FIG. 11, a motor and compressor combination has an initial startup current spike of approximately 100 amps that ends at approximately 1.5 to 2 seconds after the initial startup. After approximately 2 seconds after startup commencement, the motor drawn current value increases with the velocity command within normal limits. It is at approximately 4 seconds after startup that the effects of motor reverse rotation are apparent in the motor drawn current value. As the compressor rotates in reverse, especially for screw and scroll compressors, the internal parts begin to interfere and/or grind together, which generates heat that may lead to the welding of internal compressor components, and irreparable damage to the compressor.

For the motor and compressor combination of FIG. 11, the drawn current threshold value may be set at approximately 150 to 200 amps. This means than when the motor drawn current meets or exceeds this value, the motor would be signaled to shut down or power would be cut off to stop the motor and prevent any damage from being done to the compressor. This value of 150 to 200 amps is above the 100 amps drawn at startup and would not stop the motor and compressor assembly during a normal startup.

It is worth noting that the motor and compressor assembly of FIG. 11 was limited to 300 amps. Therefore, the motor drawn current value did not exceed that value. The test was also only run for approximately 8.5 seconds after initial startup. Had the system 300 of the present disclosure been utilized in this test, with a drawn current threshold value of either 150 or 200 amps, the motor and compressor assembly would have ceased to rotate at approximately 4 seconds after startup.

Referring to FIG. 12, a motor and compressor combination has an initial startup spike of approximately 200 amps that ends at approximately 1 second after the initial startup commencement. After approximately 1 second after startup, the motor drawn current value increases with the velocity command within normal limits. It is at just under 9 seconds after startup that the effects of motor reverse rotation are apparent in the motor drawn current value.

For the motor and compressor combination of FIG. 12, the drawn current threshold value may be set at approximately 300 amps. This means than when the motor drawn current meets or exceeds this value, the motor would be signaled to shut down or the power supply would be interrupted to stop the motor and prevent any damage from being done to the compressor. This value of 300 amps is above the 200 amps drawn at startup and above the approximately 250 amps that the motor draws during the velocity ramp up. This 300 amp drawn current threshold value would not stop the motor and compressor assembly during a normal startup, but it would stop the motor and compressor assembly prior to any damage being done. The test was run for approximately 12.5 seconds after initial startup. Had the system 300 of the present disclosure been utilized in this test, with a drawn current threshold value of approximately 300 amps, the motor and compressor assembly would have ceased to rotate at approximately 9 seconds after startup.

The previous examples of a reverse running compressor illustrate how the drawn current threshold value can vary depending on the motor and compressor combination. Several factors are utilized to determine the drawn current threshold value, they may include any one or more of the following: the rated current of the motor; the rated torque of the motor; the inertia of the compressor; the desired velocity (velocity command) and/or acceleration (ramp up of velocity command) of the compressor; and the anticipated velocity feedback. Accordingly, because these factors take into account properties of both the motor, the compressor, and the desired performance of the combination, the drawn current threshold value may be unique to each motor and compressor combination and its application and may be verified with empirical testing.

It is also appreciated that many characteristics of the drawn current value may be determined from the graphs of FIGS. 11 and 12. These characteristics may be, for example: a maximum characteristic, such as a current magnitude, which may be a summed or integrated current; an instantaneous rate of change; or a current differential.

Another factor to take into consideration is time. As shown in FIGS. 11 and 12, an initial current spike in drawn current during the startup is normal, but can lead to a false alarm that the compressor is running in reverse. Therefore, the system and methods described herein may selectively ignore this initial startup spike in drawn current and not begin to monitor the drawn current until a predetermined amount of time has lapsed after system startup. As shown in FIGS. 4 and 5, this may be after 1 to 2 seconds have passed after startup. Again, this initial time to ignore depends upon the motor and compressor combination that is utilized in the system and further depends on the factors discussed in the preceding description.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

It shall be further understood that the exemplary embodiments summarized and described in detail above and illustrated in the figures are illustrative and not limiting or restrictive. Only the presently preferred embodiments have been shown and described and all changes and modifications that come within the scope of the invention are to be protected. It shall be appreciated that the embodiments and forms described below may be combined in certain instances and may be exclusive of one another in other instances. Likewise, it shall be appreciated that the embodiments and forms described below may or may not be combined with other aspects and features disclosed elsewhere herein. It should be understood that various features and aspects of the embodiments described above may not be necessary and embodiments lacking the same are also protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The invention claimed is:

1. A system comprising:
    a refrigerant circuit including a compressor configured to compress refrigerant, a condenser configured to receive refrigerant from the compressor, and an expander configured to receive refrigerant from the condenser;
    an electric motor configured to drive the compressor;
    a motor drive configured to drive the electric motor; and
    a controller configured to control the motor drive to drive the electric motor;
    wherein the controller is configured to
        first evaluate whether the compressor is idle based upon a control state of the controller being configured not to operate the motor drive to drive the motor,
        second, in response to an affirmative evaluation that the compressor is idle, evaluate a risk of undesired or un-commanded compressor rotation based upon a combination of two or more system conditions, each of the two or more system conditions indicating the risk of undesired or un-commanded compressor rotation, and
        third, in response to an affirmative evaluation of the risk of undesired or un-commanded compressor rotation, control the motor drive to oppose rotation of the compressor.

2. The system according to claim 1 wherein the controller being configured to control the motor drive to oppose rotation of the compressor comprises the controller being configured to control the motor drive to close two or more switching devices to provide a closed circuit condition effective to provide an electrical resistance of the motor to current generated by rotation of the motor.

3. The system according to claim 2 wherein the closed circuit condition comprises providing a closed circuit including two or more windings of the motor and a rail of the motor drive.

4. The system according to claim 1 wherein the controller being configured to control the motor drive to oppose rotation of the compressor comprises the controller being configured to control the motor drive to provide a DC current to the motor effective to urge the motor to a predetermined alignment and resist rotation of the motor.

5. The system according to claim 1 wherein one of the of two or more system conditions comprises a pressure differential across the compressor associated with risk of undesired or un-commanded compressor rotation.

6. The system according to claim 1 wherein one of the of two or more system conditions comprises a pressure condition associated with risk of undesired or un-commanded compressor rotation.

7. The system according to claim 1 wherein the motor drive comprises an inverter.

8. The system according to claim 1 wherein the motor drive comprises a variable frequency drive.

9. The system according to claim 1 wherein the condition associated with risk of undesired or un-commanded compressor rotation comprises rotation of a rotor of the motor.

10. The system according to claim 1 wherein the condition associated with risk of undesired or un-commanded compressor rotation comprises rotation of the compressor being detected with a sensor.

11. The system according to claim 1 wherein the condition associated with risk of undesired or un-commanded compressor rotation comprises back EMF indicative of rotation being detected at a motor terminal.

12. The system of claim 1 wherein the two or more system conditions include detection of one of a potential and a current at the motor terminals and detection of a pressure condition associated with the compressor.

13. A method comprising:
    providing a system comprising a refrigerant circuit including a compressor configured to compress refrigerant, a condenser configured to receive refrigerant from the compressor and an expander configured to receive refrigerant from the condenser, an electric motor configured to drive the compressor, a motor drive configured to drive the electric motor, and a controller configured to control the motor drive to drive the electric motor;

operating the controller to first evaluate whether the compressor is idle based upon a control state of the controller being configured not to operate the motor drive to drive the motor;

operating the controller to second, in response to an affirmative evaluation that the compressor is idle, evaluate a risk of undesired or un-commanded compressor rotation based upon a combination of two or more system conditions, each of the two or more system conditions indicating the risk of undesired or un-commanded compressor rotation; and operating the controller to third, in response to an affirmative evaluation of the risk of undesired or un-commanded compressor rotation, control the motor drive to oppose rotation of the compressor.

14. The method of claim 13 wherein the act of operating the controller to control the motor drive to oppose rotation of the compressor comprises operating the controller to control the motor drive to close two or more switching devices to provide a closed circuit condition effective to provide an electrical resistance of the motor to current generated by rotation of the motor.

15. The method of claim 14 wherein the closed circuit condition comprises providing a closed circuit including two or more windings of the motor and a rail of the motor drive.

16. The method of claim 13 wherein the motor drive comprises an inverter.

17. The method of claim 13 wherein the motor drive comprises a variable frequency drive.

18. The method of claim 13 wherein the condition associated with risk of compressor rotation comprises rotation of a rotor of the motor when compressor rotation is not commanded.

* * * * *